United States Patent
Song et al.

(10) Patent No.: US 10,533,697 B2
(45) Date of Patent: Jan. 14, 2020

(54) REFRIGERATOR AND MANUFACTURING METHOD THEREFOR

(71) Applicant: Samsung Electronics Co., Ltd., Suwon-si, Gyeonggi-do (KR)

(72) Inventors: Myung Seob Song, Yongin-si (KR); Dae Hwan Kim, Seoul (KR); Min Soo Kim, Seoul (KR); Jin Seung Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/769,687

(22) PCT Filed: Oct. 10, 2016

(86) PCT No.: PCT/KR2016/011308
§ 371 (c)(1),
(2) Date: Apr. 19, 2018

(87) PCT Pub. No.: WO2017/069440
PCT Pub. Date: Apr. 27, 2017

(65) Prior Publication Data
US 2018/0299060 A1   Oct. 18, 2018

(30) Foreign Application Priority Data

Oct. 19, 2015   (KR) ........................ 10-2015-0145573

(51) Int. Cl.
*F25D 23/06* (2006.01)
*F16L 59/065* (2006.01)

(52) U.S. Cl.
CPC ............ *F16L 59/065* (2013.01); *F25D 23/06* (2013.01); *F25D 23/063* (2013.01);
(Continued)

(58) Field of Classification Search
CPC ... Y10T 428/231; F25D 23/06; F25D 23/063; F25D 23/065; F25D 2201/126; F25D 2201/14
See application file for complete search history.

(56) References Cited

U.S. PATENT DOCUMENTS

| | | | |
|---|---|---|---|
| 2,768,046 A * | 10/1956 | Evans | F25D 23/062 220/592.09 |
| 3,401,997 A | 9/1968 | Hanifan | |
| 2014/0216100 A1 * | 8/2014 | Toshimitsu | F16L 59/065 62/440 |

FOREIGN PATENT DOCUMENTS

| | | |
|---|---|---|
| CN | 100441932 C | 12/2008 |
| CN | 201651674 U | 11/2010 |
| CN | 102829593 A | 12/2012 |
| CN | 103968196 A | 8/2014 |
| CN | 104272045 A | 1/2015 |
| EP | 0071090 A1 | 2/1983 |
| EP | 2869006 A1 * | 5/2015 ........... F25D 23/062 |

(Continued)

OTHER PUBLICATIONS

European Patent Office, "Supplementary European Search Report," Application No. EP 16857698.1, dated Sep. 11, 2018, 87 pages.
(Continued)

*Primary Examiner* — Alexander S Thomas

(57) ABSTRACT

Disclosed is a refrigerator including an ultrathin wall type insulating wall having a reduced thickness while maintaining insulating performance, so as to increase the capacity of a storage chamber. A vacuum insulating material is disposed inside the insulating wall so as to ensure the insulating performance of the insulating wall, and a foam material, in the portion in which the vacuum insulating material is not disposed, is disposed to be thicker than a foam material in the portion in which the vacuum insulating wall is disposed, such that the insulating wall, which maintains insulating performance while maintaining the insulating wall having an overall ultrathin shape, can be formed. Furthermore, auxiliary vacuum insulating materials are additionally disposed in the insulating wall corner regions in which the vacuum (Continued)

insulating material is not disposed, such that the ultrathin wall-type insulating wall is formed while maintaining the overall insulating performance of the refrigerator, thereby reducing the total thickness of the insulating wall so as to increase the capacity of the storage chamber, and enabling a slim design of the refrigerator such that the aesthetics of the refrigerator can be improved.

15 Claims, 27 Drawing Sheets

(52) U.S. Cl.
CPC ......... *F25D 23/064* (2013.01); *F25D 23/065* (2013.01); *F25D 23/066* (2013.01); *F25D 23/067* (2013.01); *F25D 2201/10* (2013.01); *F25D 2201/12* (2013.01); *F25D 2201/126* (2013.01); *F25D 2201/128* (2013.01); *F25D 2201/14* (2013.01); *Y10T 428/231* (2015.01)

(56) References Cited

FOREIGN PATENT DOCUMENTS

| | | | |
|---|---|---|---|
| JP | 2012063038 | A | 3/2012 |
| JP | 2013002655 | A | 1/2013 |
| JP | 2014126219 | A | 7/2014 |
| KR | 20070023524 | A | 2/2007 |
| KR | 10-0790662 | B1 | 1/2008 |
| KR | 10-2011-0015325 | A | 2/2011 |
| WO | 2013110499 | A1 | 8/2013 |

OTHER PUBLICATIONS

ISA/KR, "International Search Report and Written Opinion of the International Searching Authority," International Application No. PCT/KR2016/011308, dated Jan. 18, 2017, 13 pages.

China National Intellectual Property Administration, "The First Office Action," Application No. CN201680061230.6, dated Sep. 25, 2019, 18 pages.

* cited by examiner

[Fig. 1]
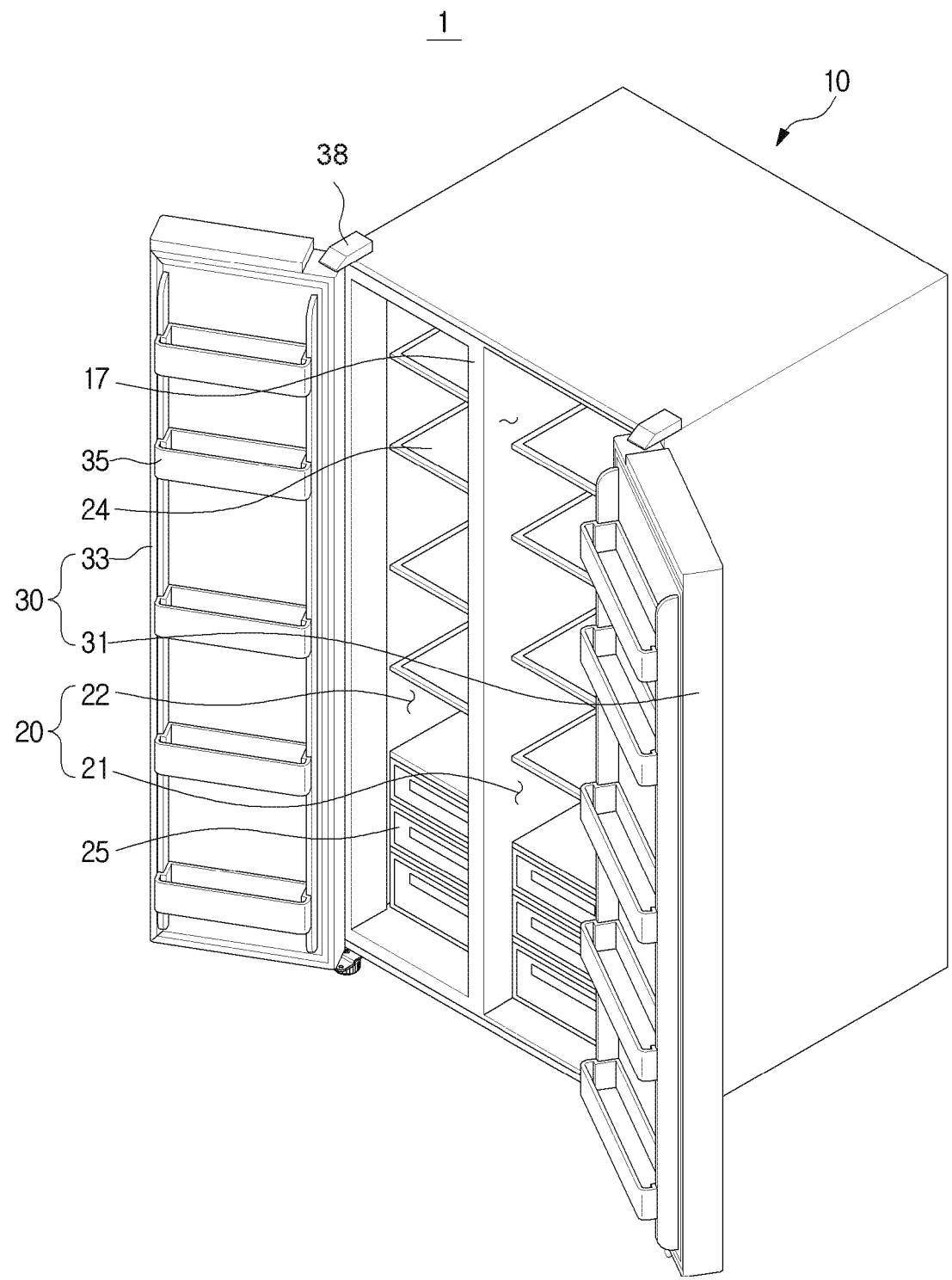

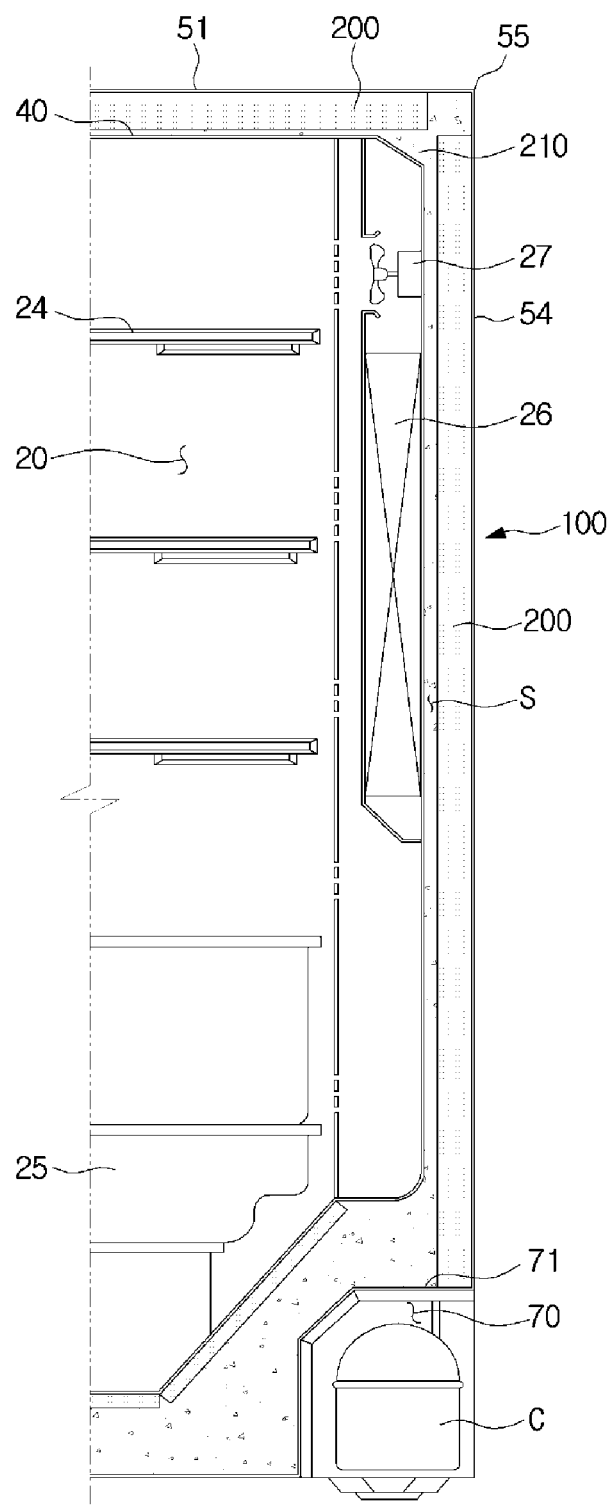
[Fig. 2]

[Fig. 3]
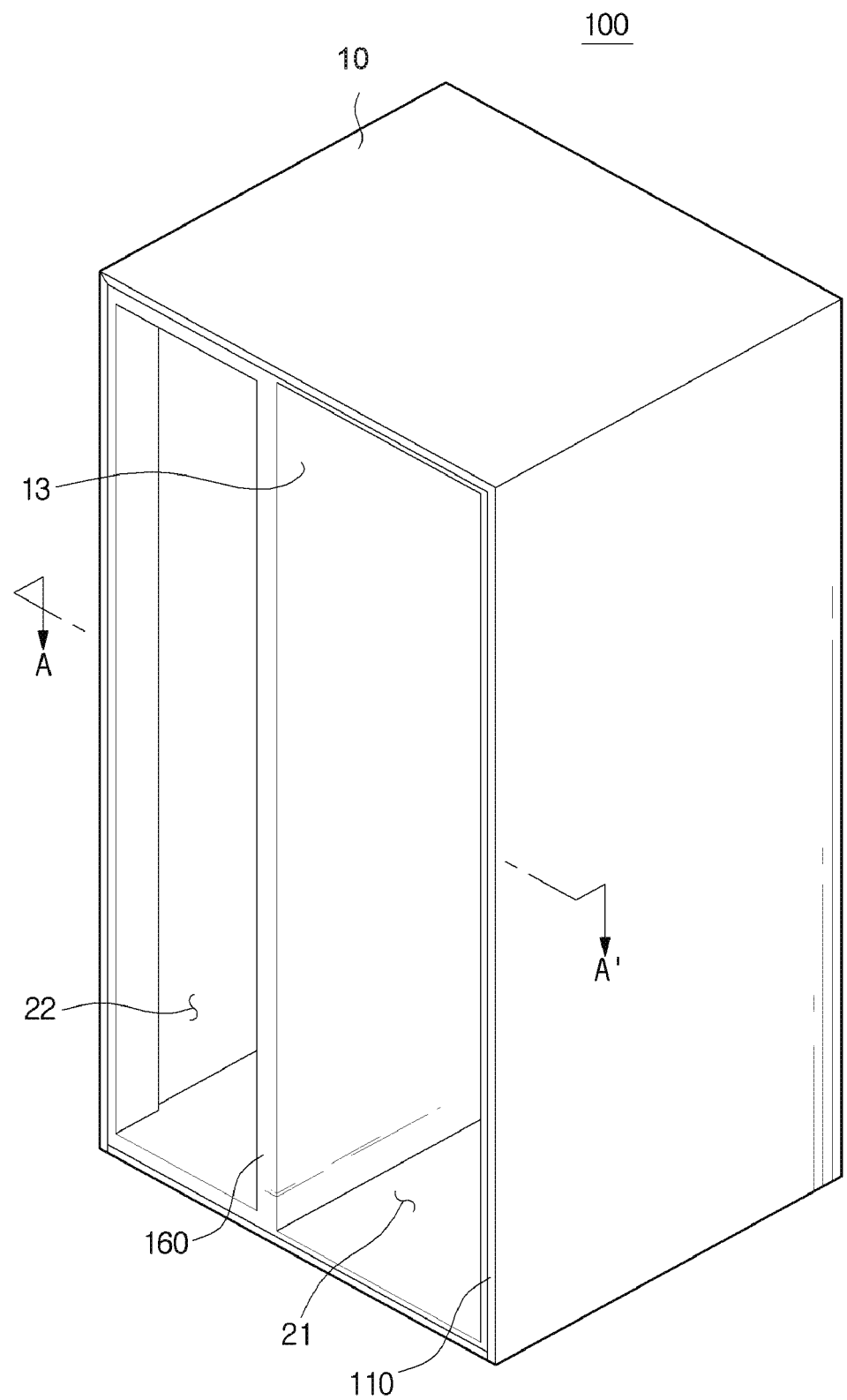

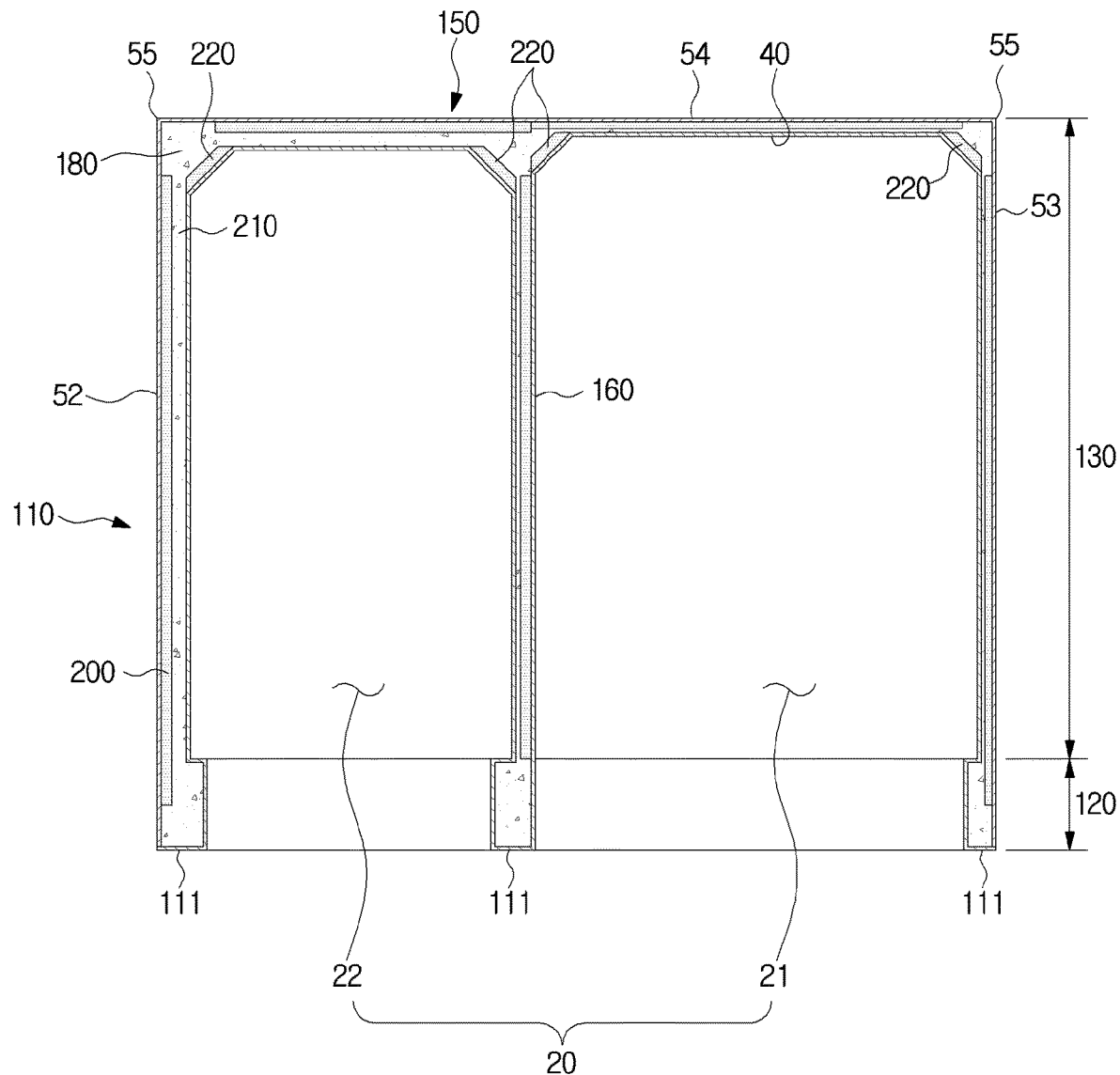
[Fig. 4]

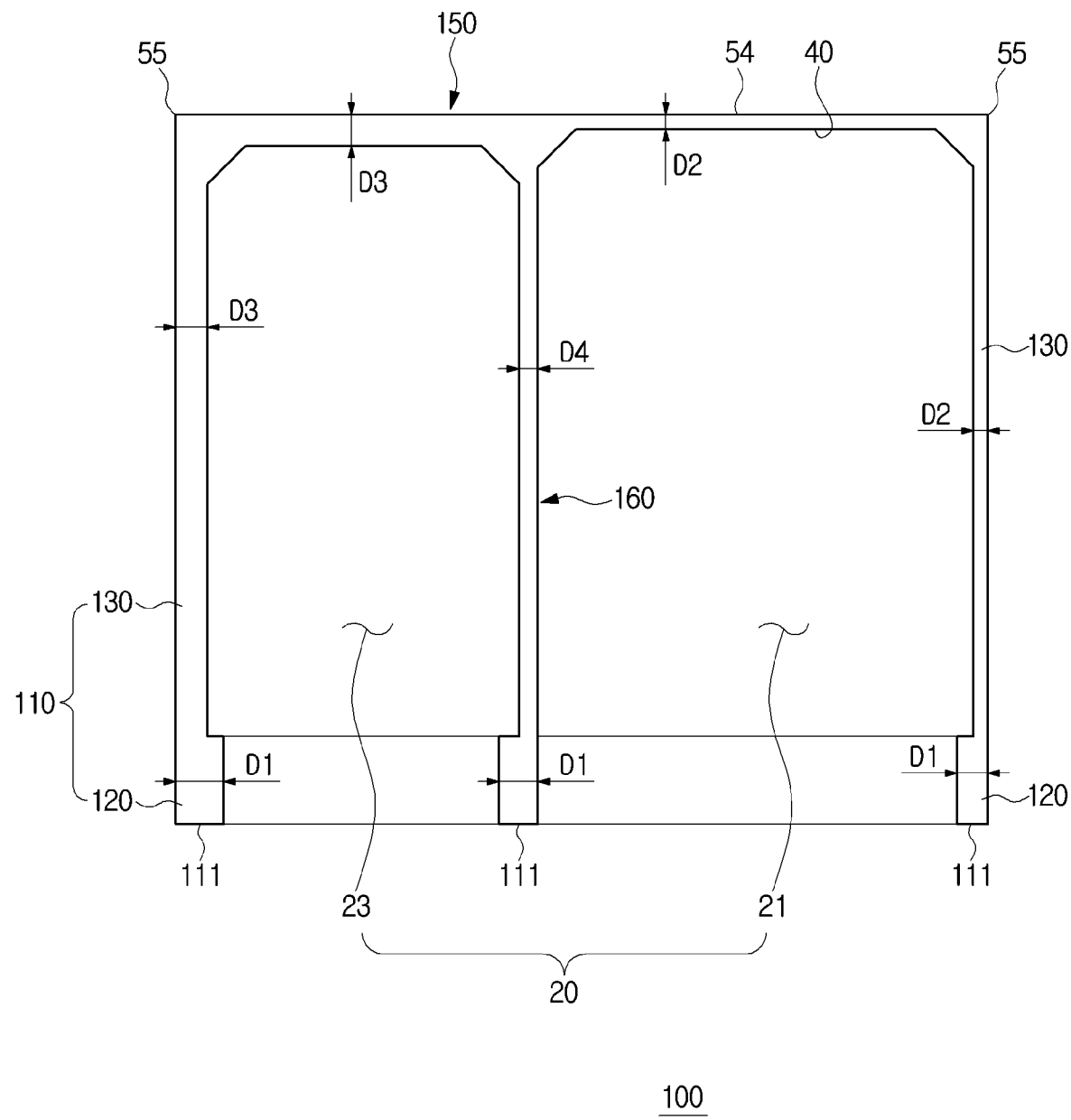
[Fig. 5]

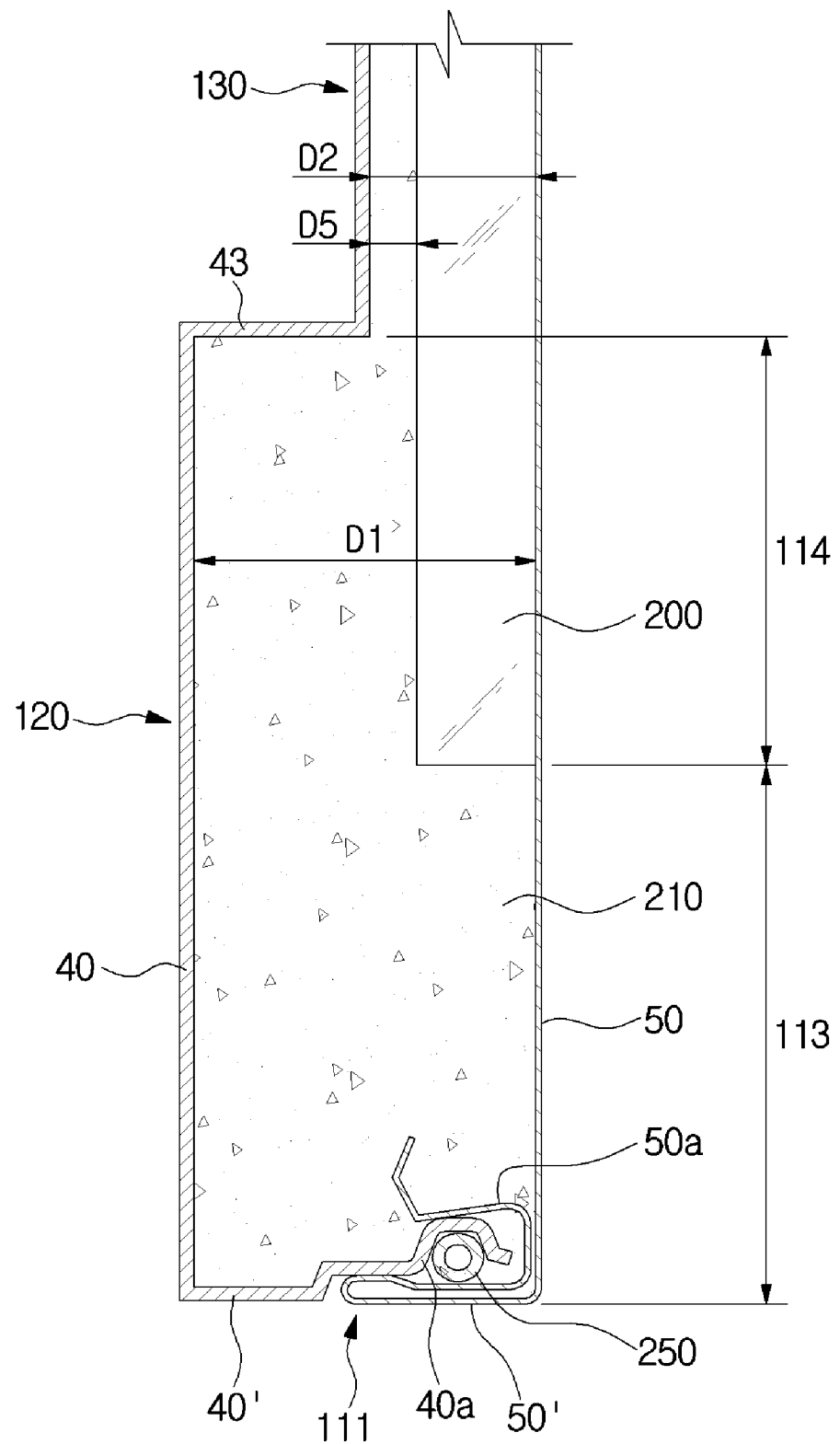
[Fig. 6]

[Fig. 7]
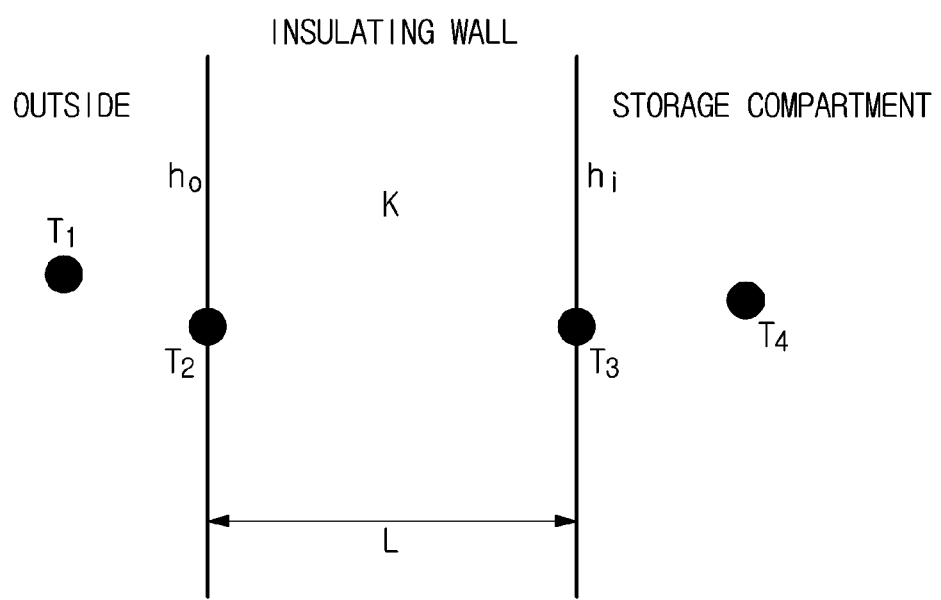

[Fig. 8]

| REFRIGERATOR COMPARTMENT | | | |
|---|---|---|---|
| | SYMBOL | VALUE | UNIT |
| HEAT TRANSFER RATE OF FOAM MATERIAL | k | 0.02 | [W/m·k] |
| OUTER CASING (h) | $h_o$ | 6.7 | [W/m²·k] |
| INNER CASING (h) | $h_i$ | 8 | [W/m²·k] |
| OUTSIDE TEMPERATURE | T1 | 35 | [°C] |
| DEW POINT TEMPERATURE OF OUTER CASING | $T_2$ | 32.1 | [°C] |
| WALL TEMPERATURE OF INNER CASING | $T_3$ | 3.4 | [°C] |
| TEMPERATURE OF STORAGE COMPARTMENT | $T_4$ | 1 | [°C] |
| NECESSARY THICKNESS OF INSULATION PANEL | L | 0.030 | [m] |

[Fig. 9]

| FREEZER COMPARTMENT | | | |
|---|---|---|---|
| | SYMBOL | VALUE | UNIT |
| HEAT TRANSFER RATE OF FOAM MATERIAL | $k$ | 0.02 | [W/m · k] |
| OUTER CASING (h) | $h_o$ | 6.7 | [W/m² · k] |
| INNER CASING (h) | $h_i$ | 8 | [W/m² · k] |
| OUTSIDE TEMPERATURE | $T_1$ | 35 | [℃] |
| DEW POINT TEMPERATURE OF OUTER CASING | $T_2$ | 32.1 | [℃] |
| WALL TEMPERATURE OF INNER CASING | $T_3$ | −20.6 | [℃] |
| TEMPERATURE OF STORAGE COMPARTMENT | $T_4$ | −23 | [℃] |
| NECESSARY THICKNESS OF INSULATION PANEL | $L$ | 0.054 | [m] |

[Fig. 10]
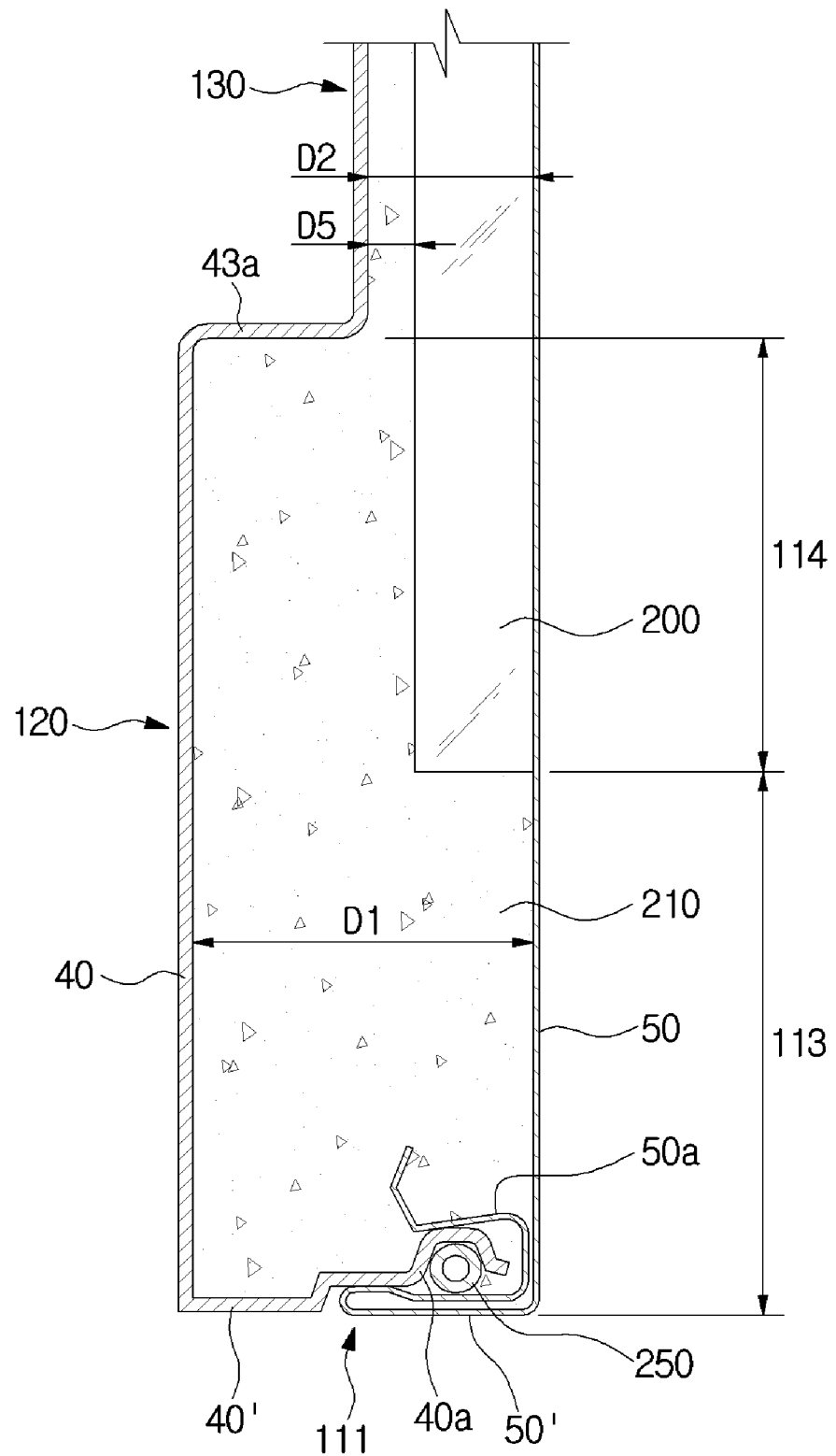

[Fig. 11]
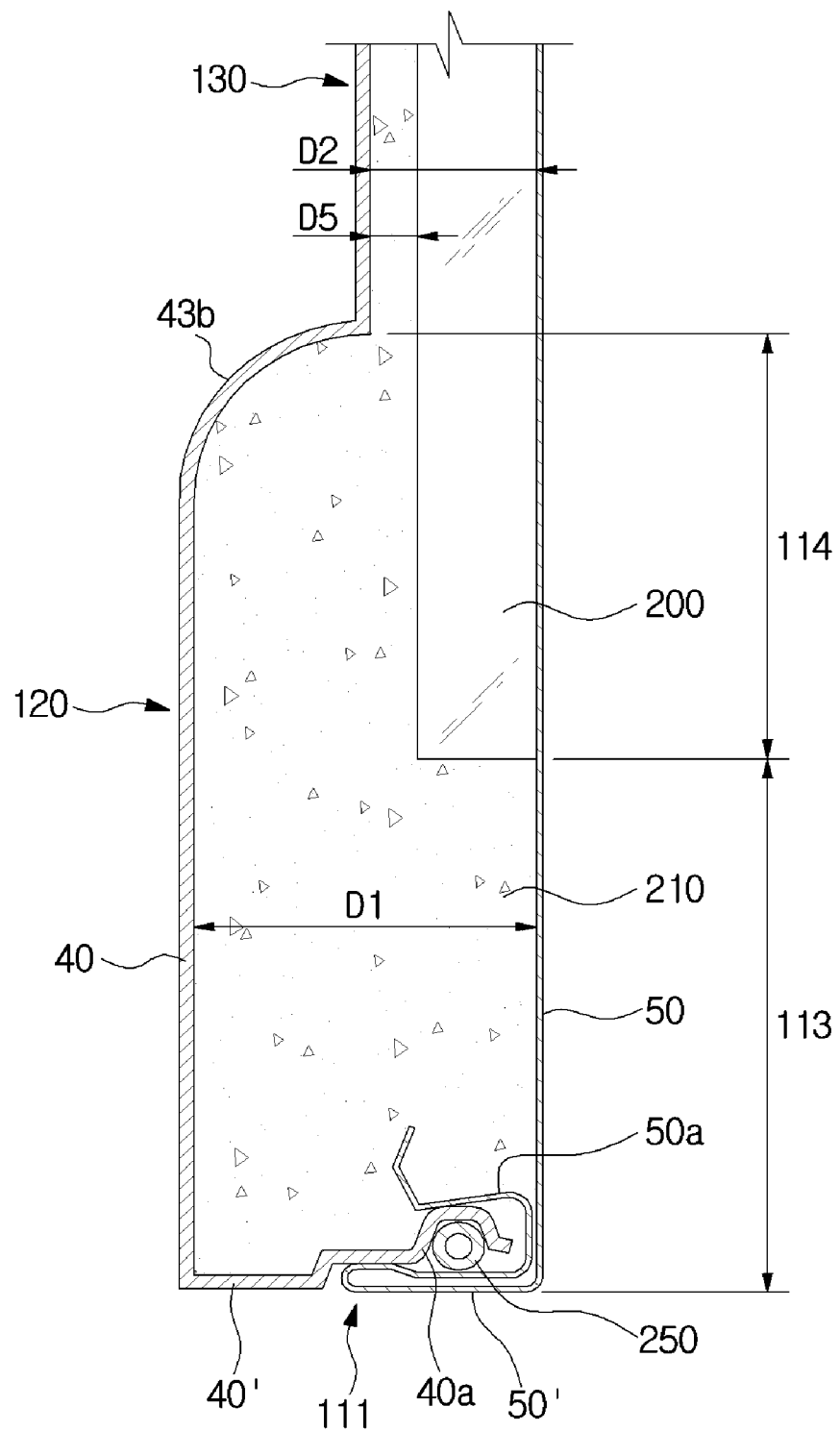

[Fig. 12]
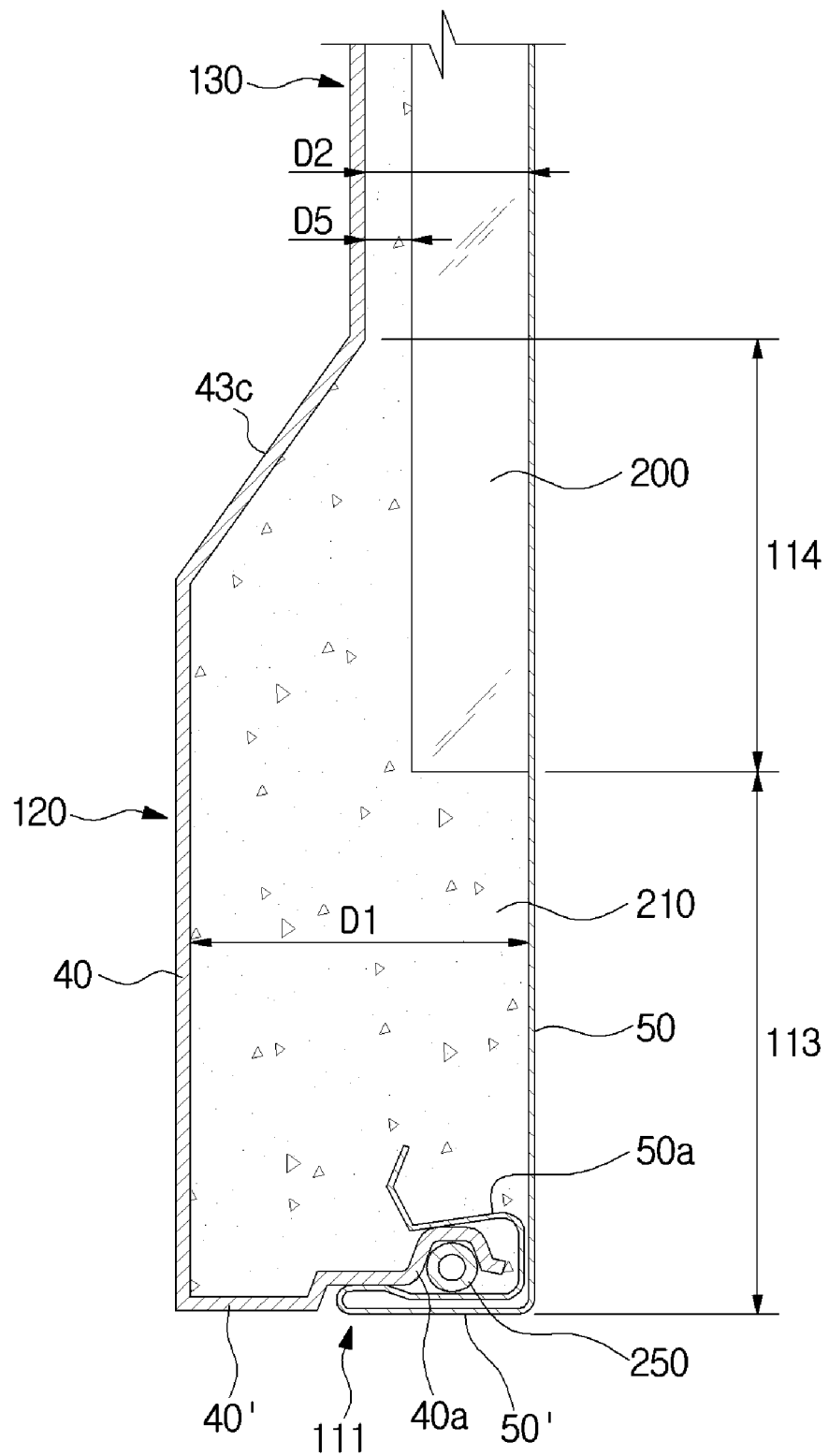

[Fig. 13]
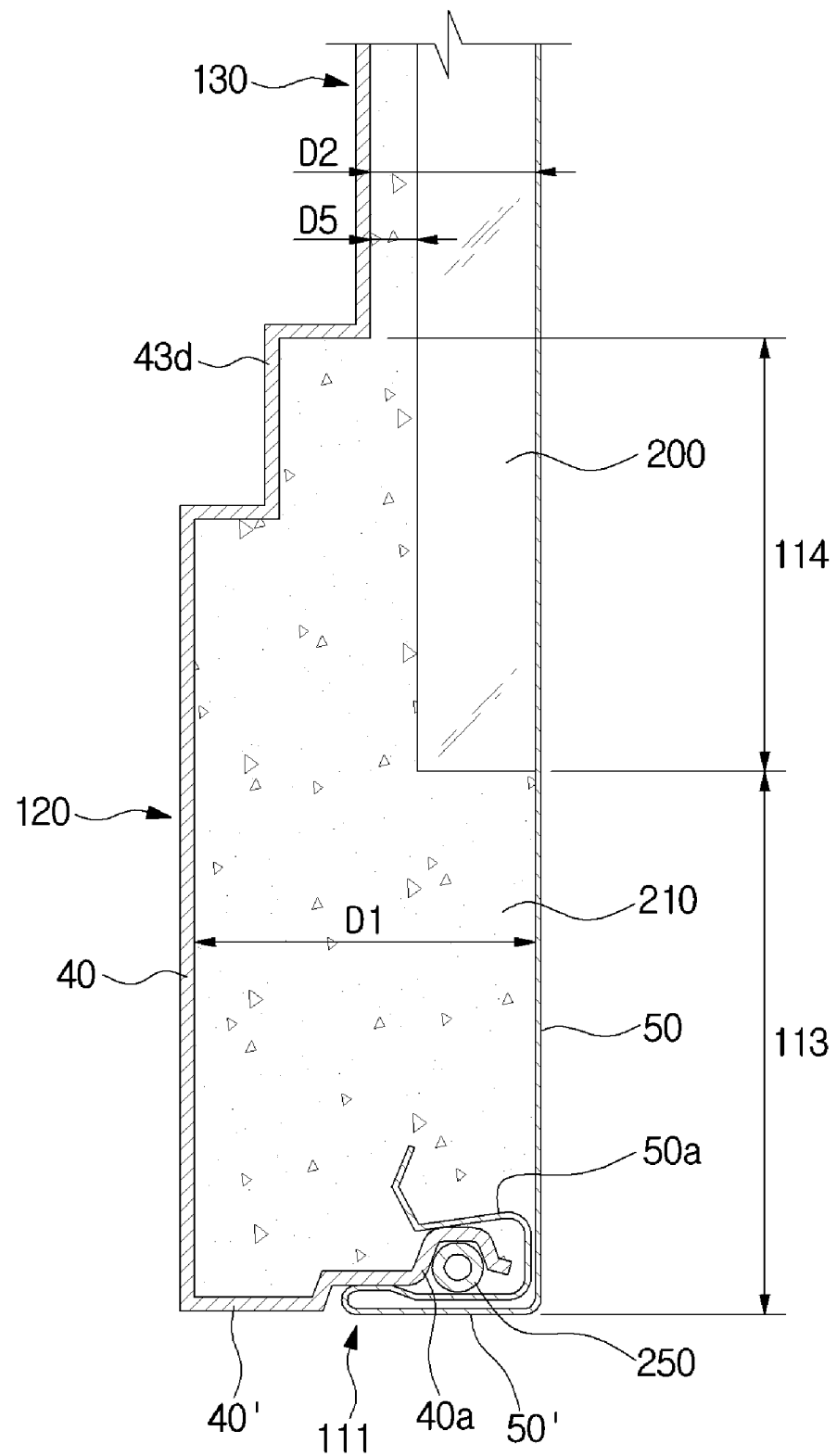

[Fig. 14]
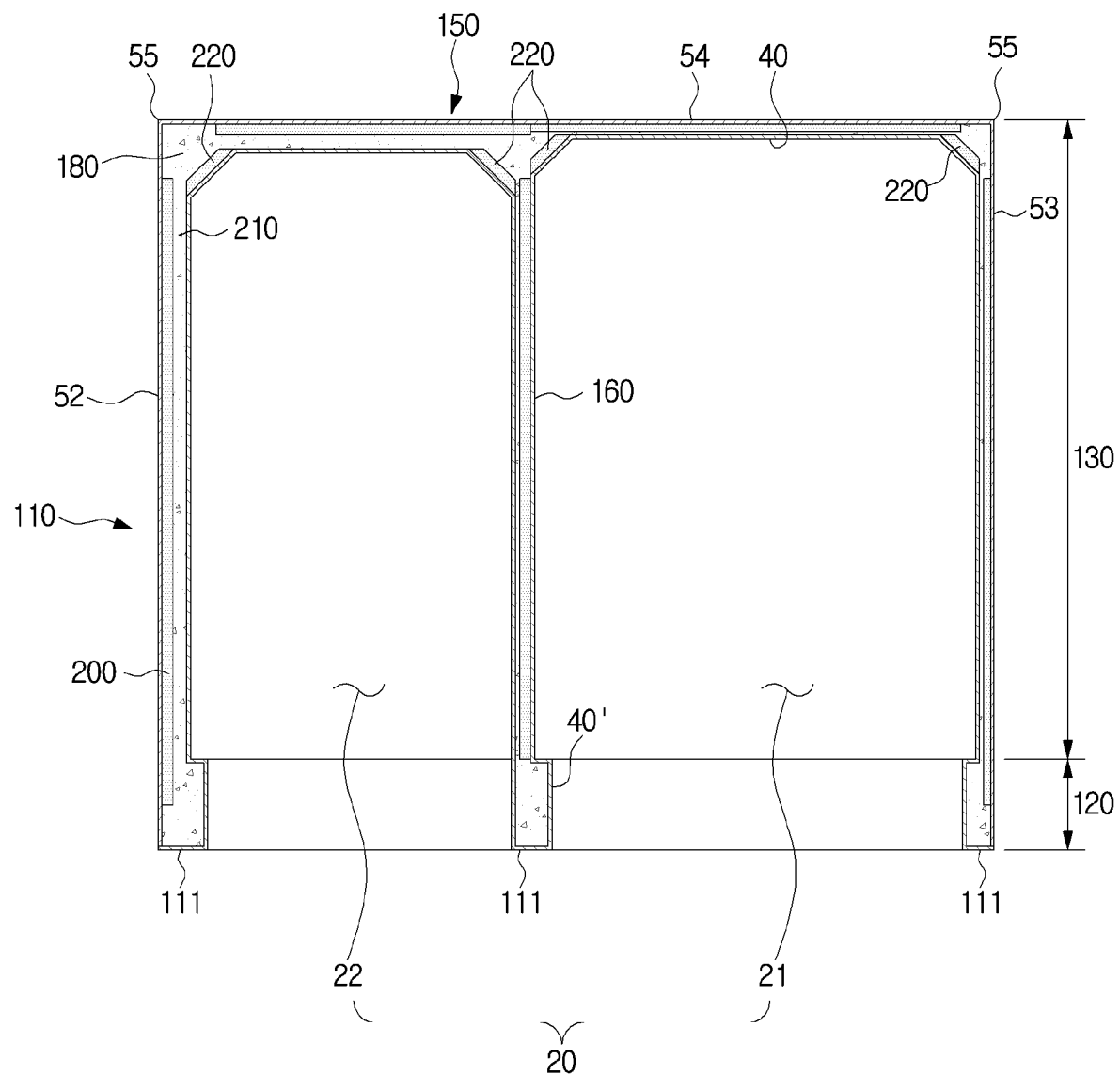

[Fig. 15]
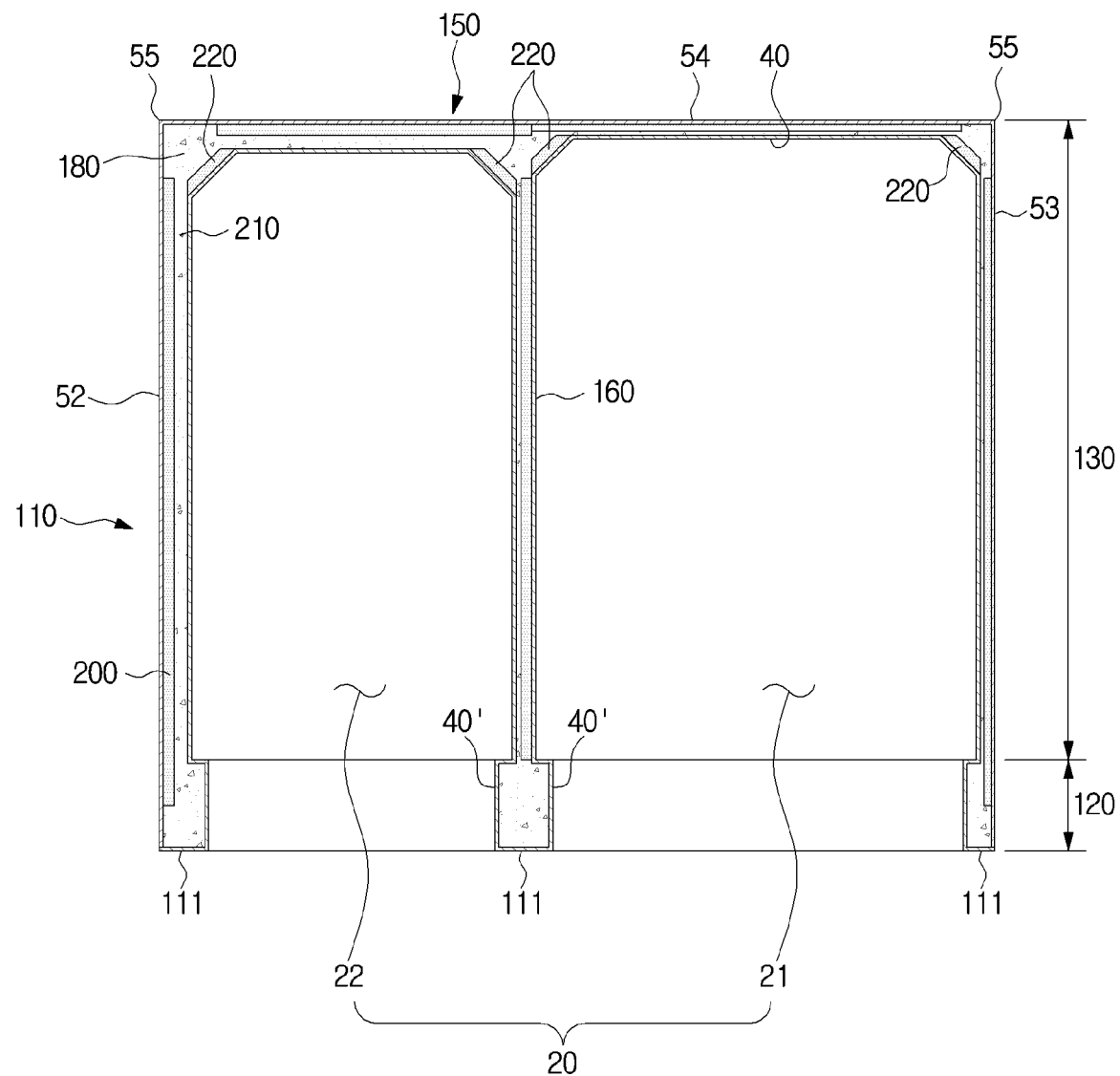

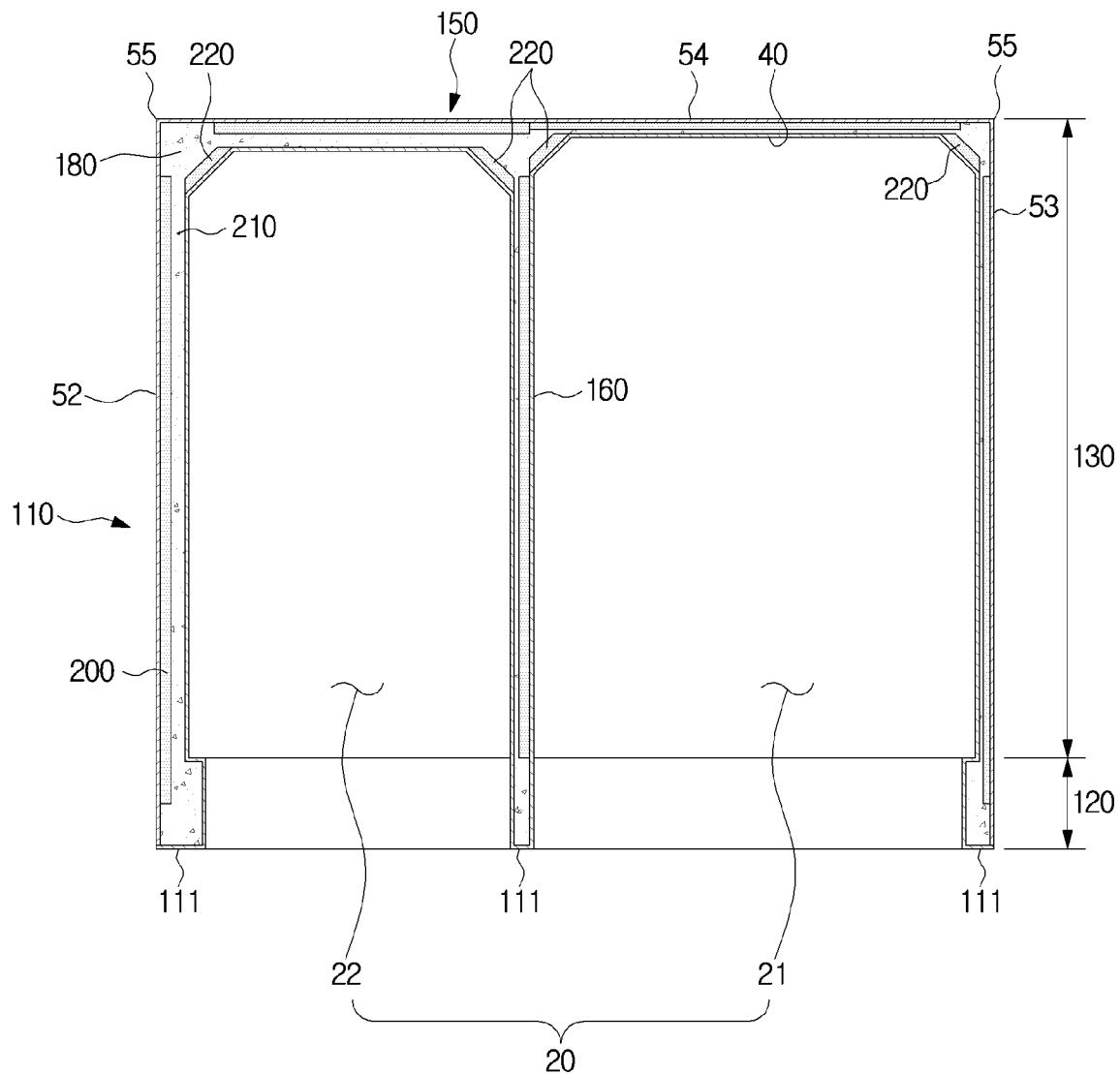
[Fig. 16]

[Fig. 17]
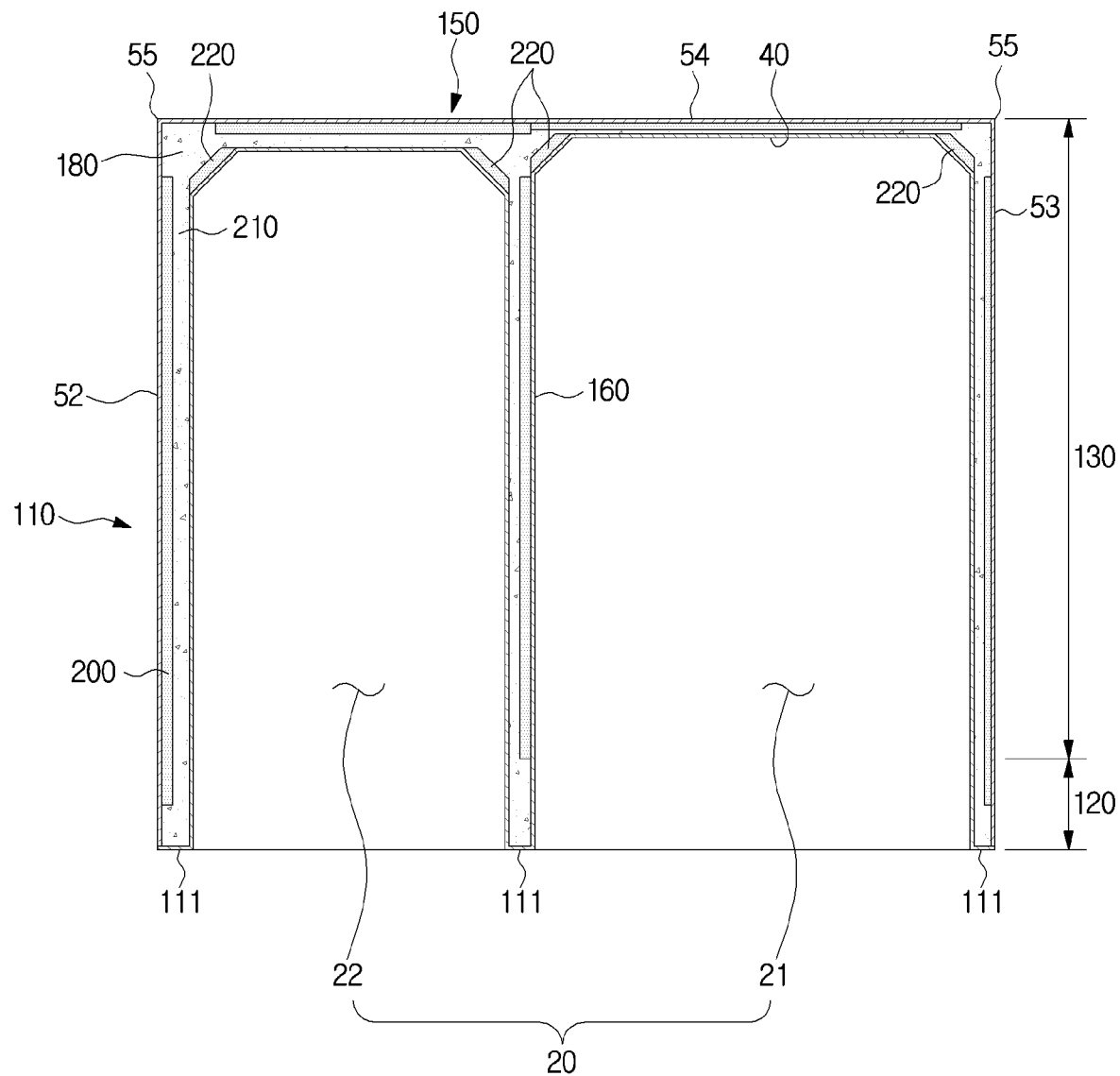

[Fig. 18]
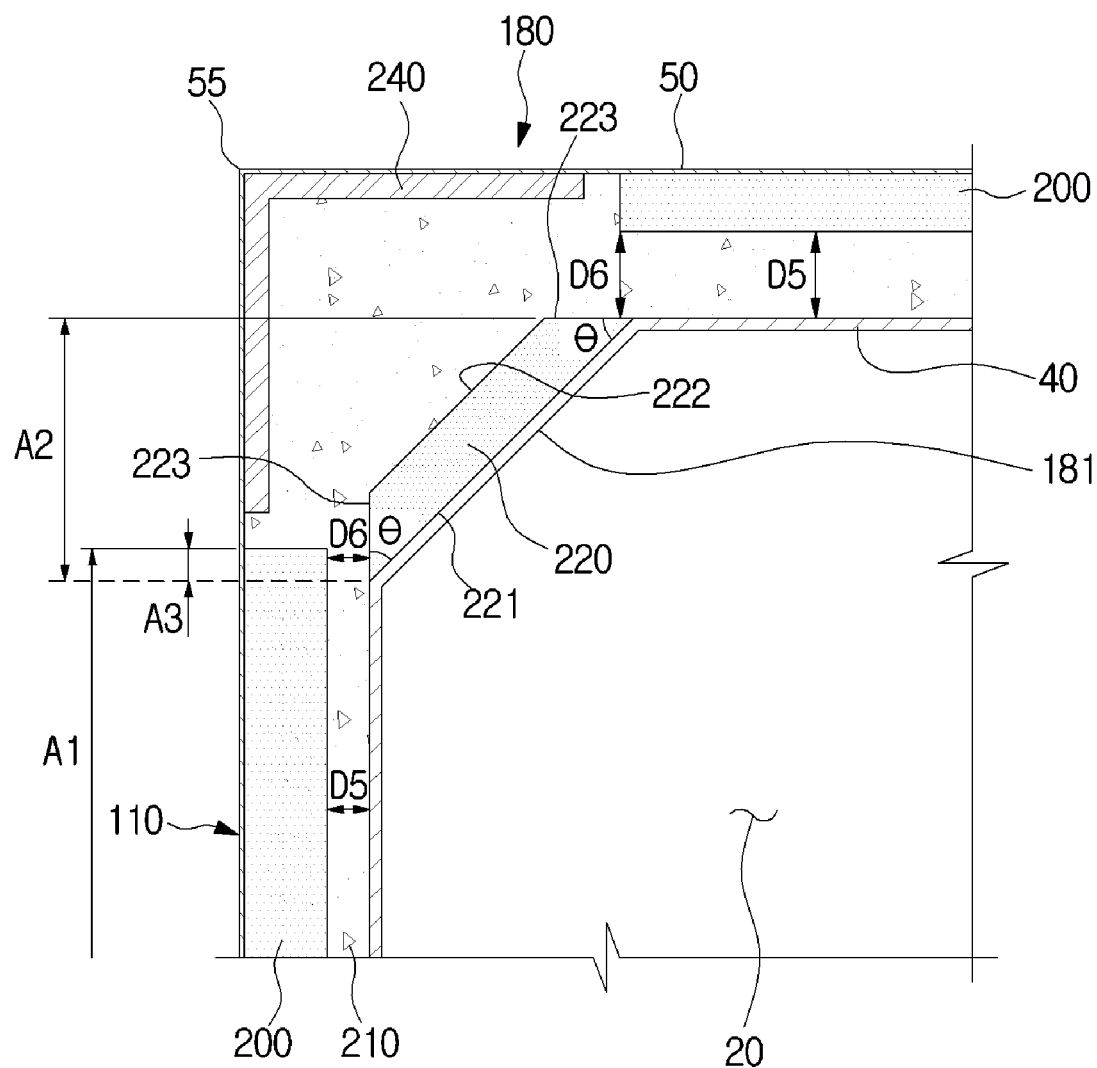

[Fig. 19]
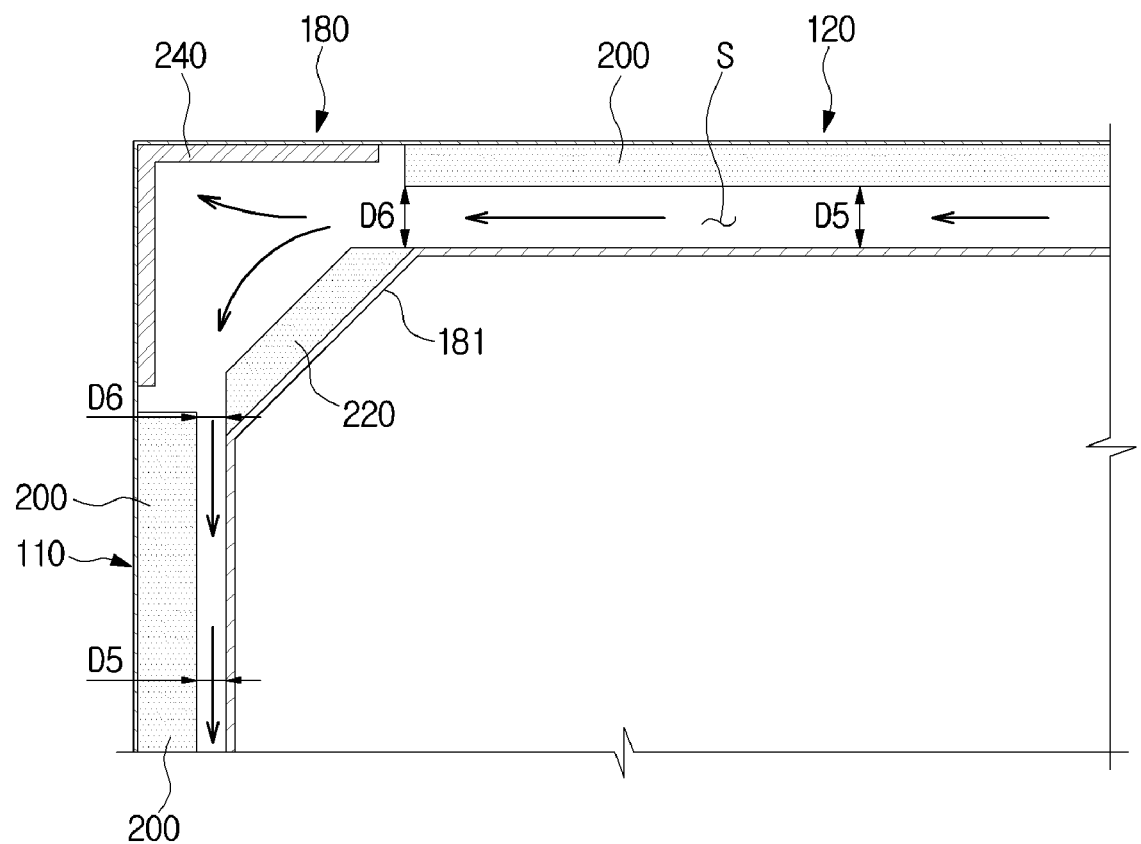

[Fig. 20]
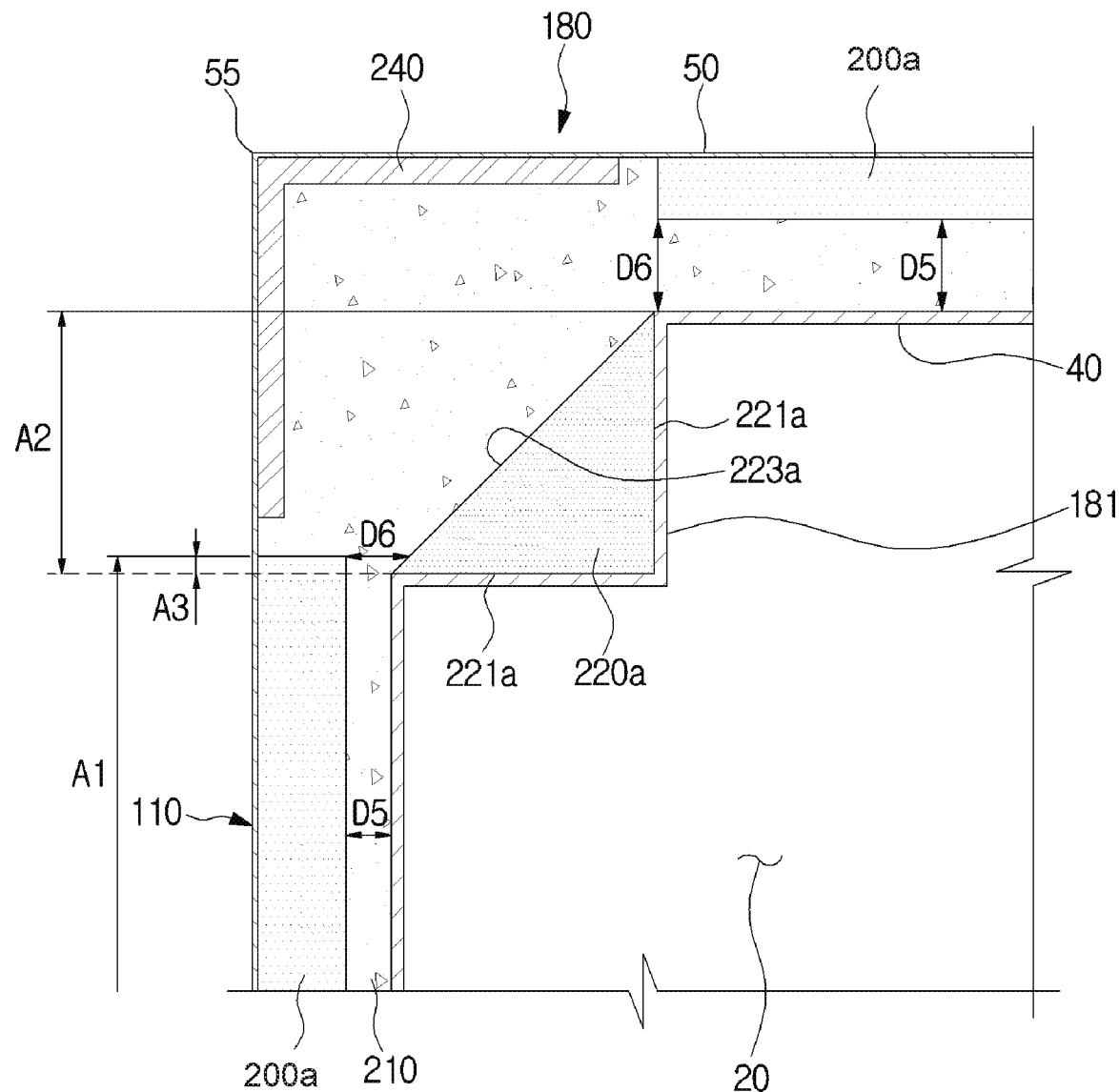

[Fig. 21]
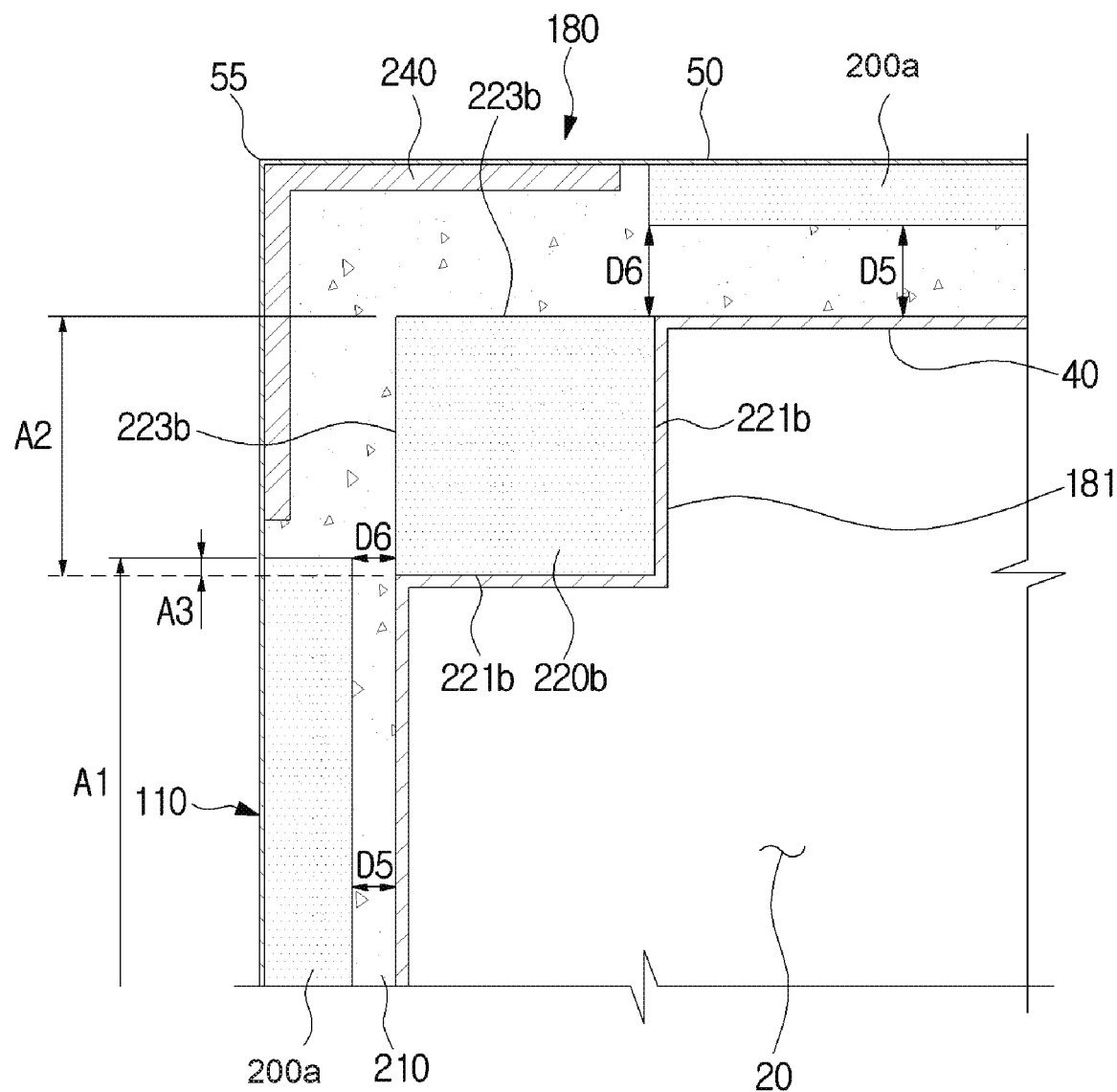

[Fig. 22]
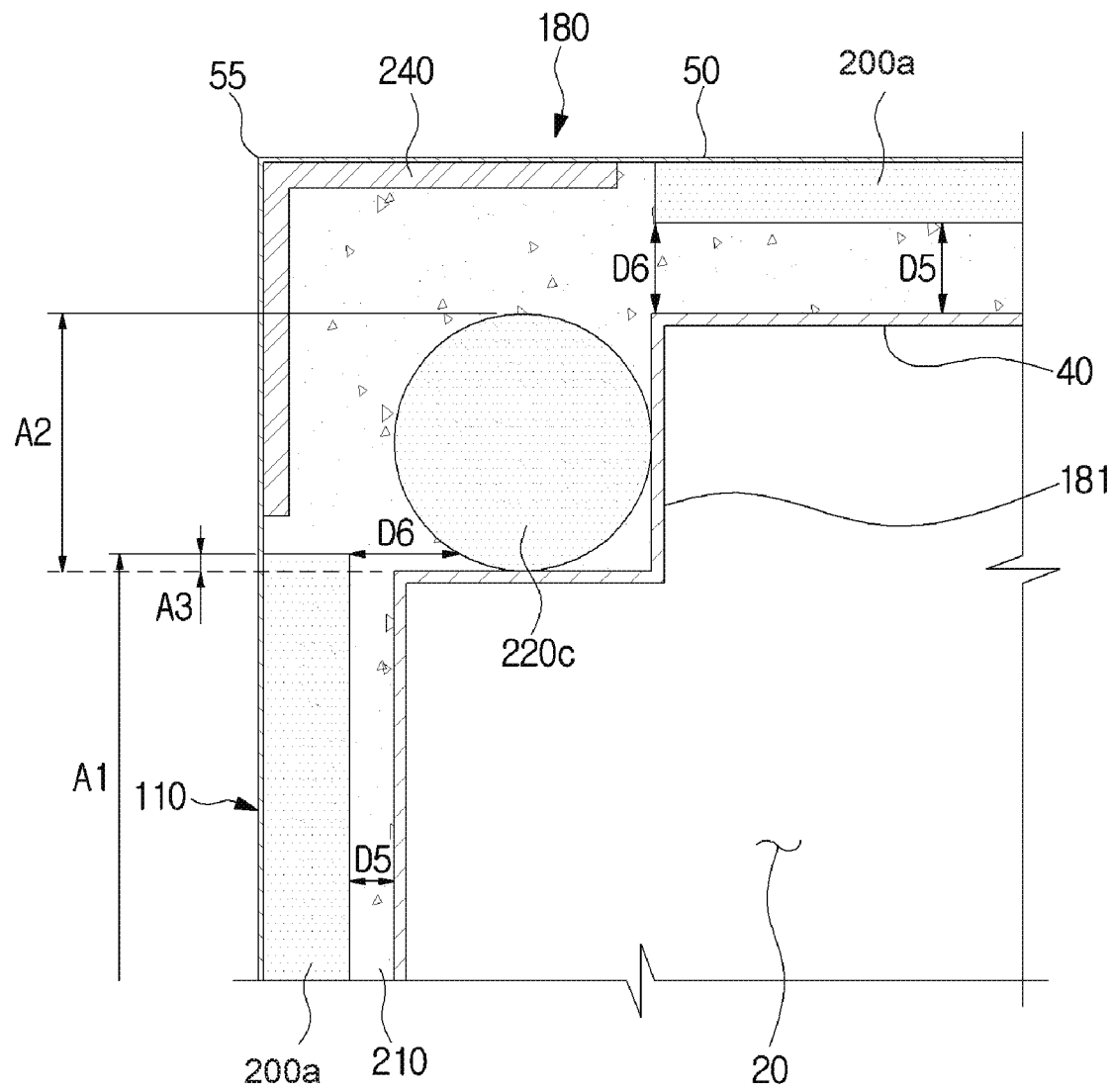

[Fig. 23]
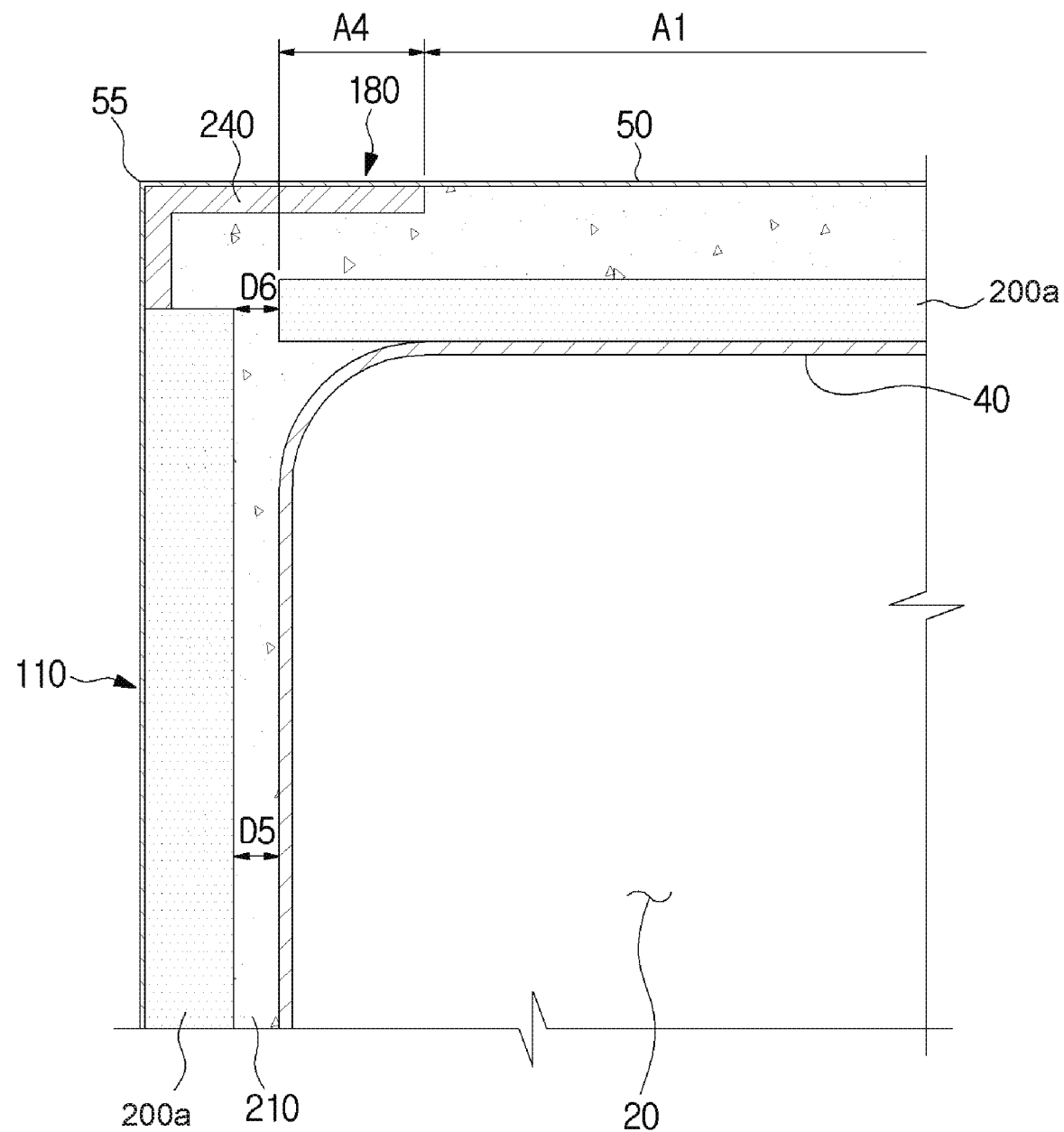

[Fig. 24]
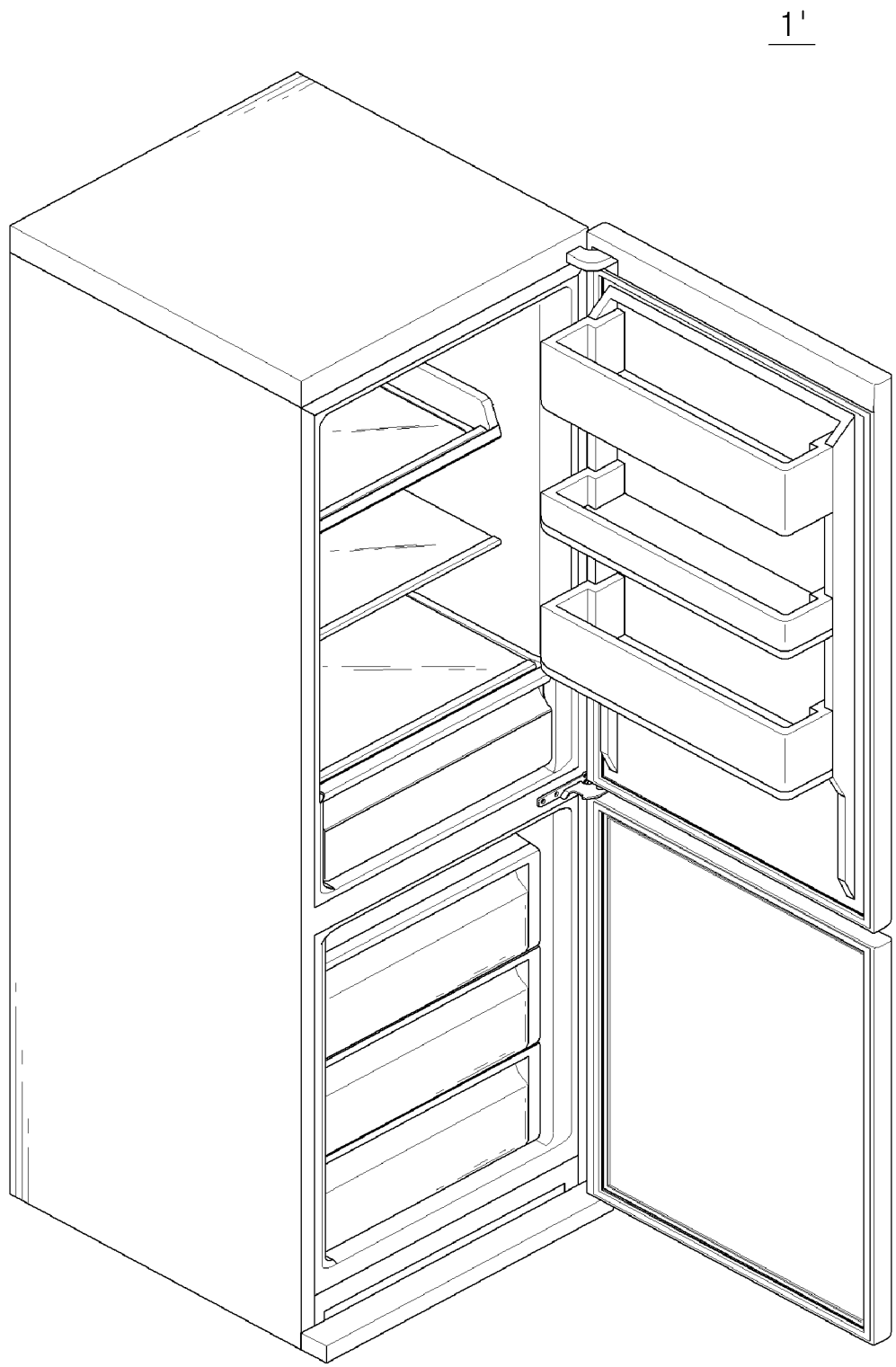

【Fig. 25】
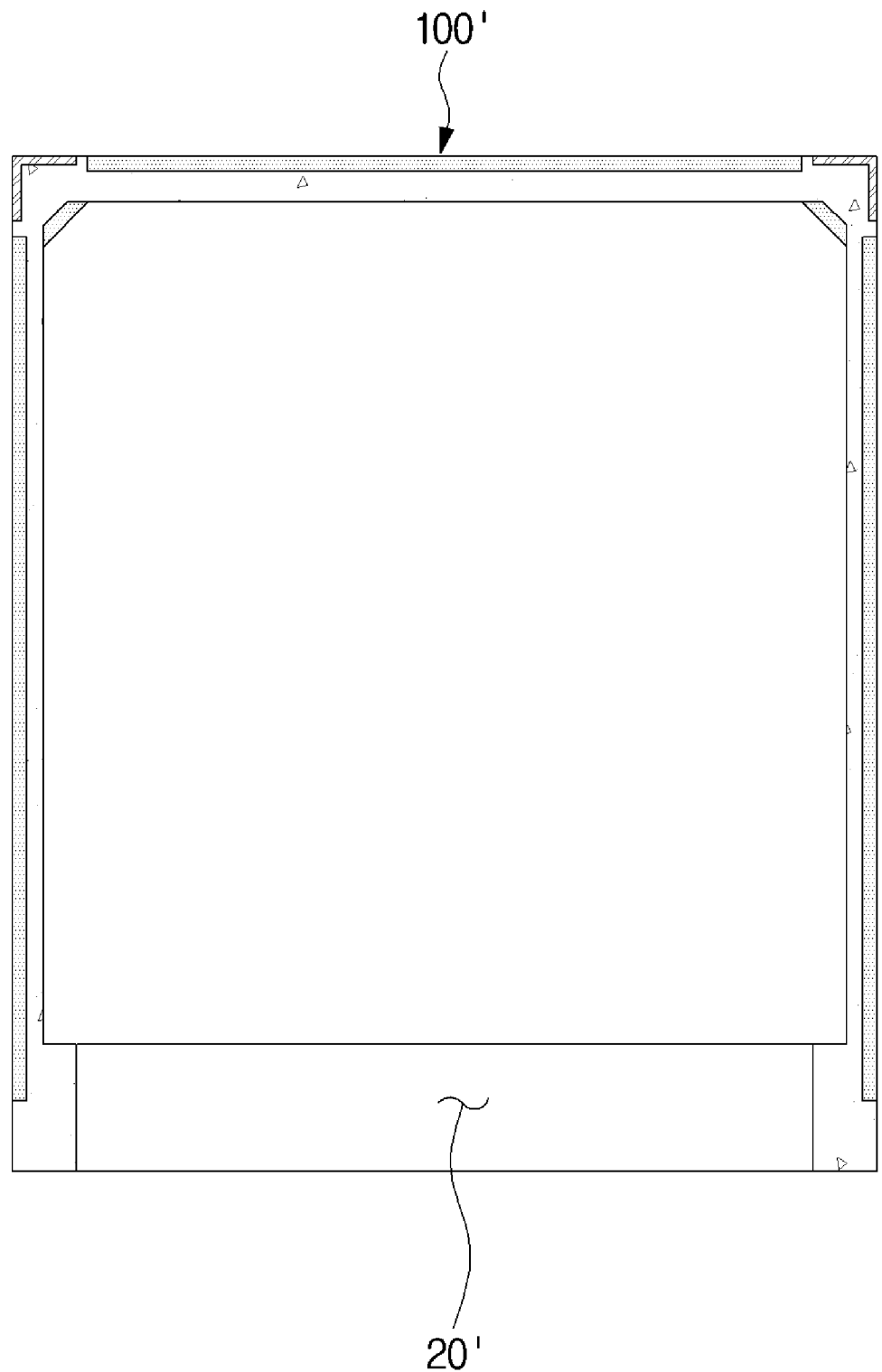

[Fig. 26]
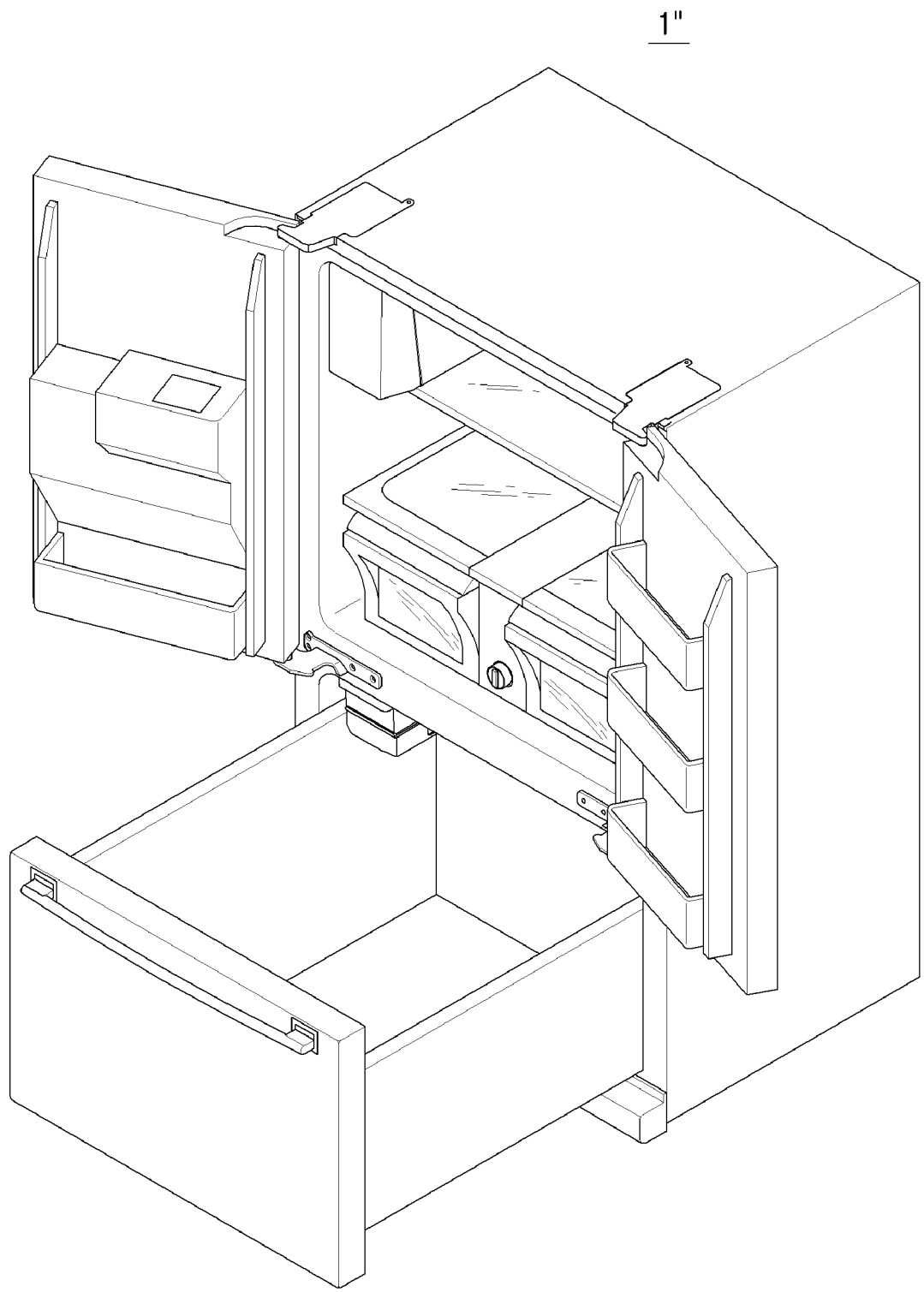

[Fig. 27]
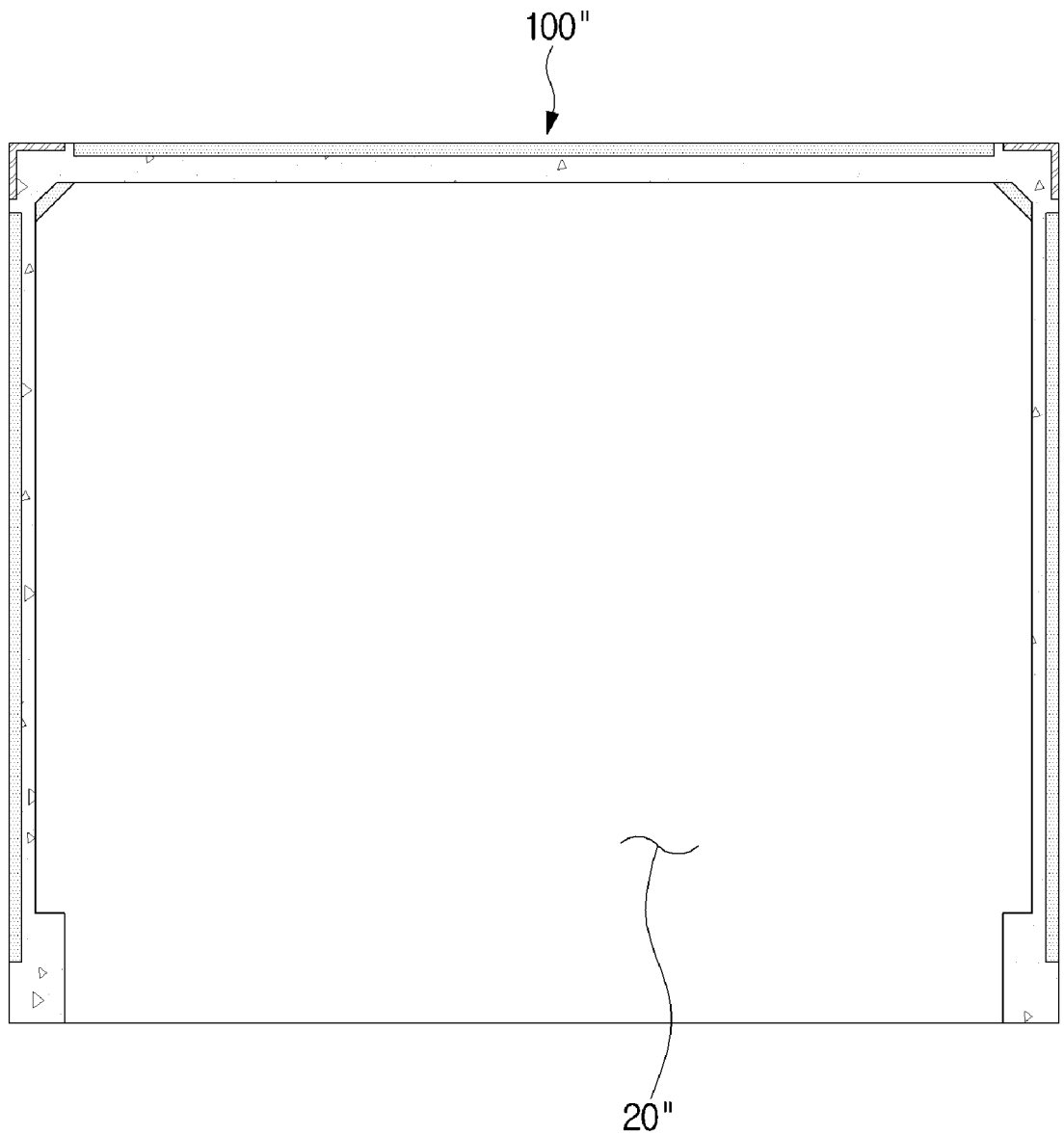

REFRIGERATOR AND MANUFACTURING METHOD THEREFOR

CROSS-REFERENCE TO RELATED APPLICATIONS AND CLAIM OF PRIORITY

This application is a 371 of International Application No. PCT/KR2016/011308, filed Oct. 10, 2016, which claims priority to Korean Patent Application No. KR 10-2015-0145573, filed Oct. 19, 2015, the disclosures of which are herein incorporated by reference in their entirety.

TECHNICAL FIELD

The present invention relates to a vacuum insulation member and a refrigerator including the same, and more particularly, to a refrigerator having an insulating wall including a vacuum insulation member.

BACKGROUND

Energy consumed by humankind is limited, and global warming caused by carbon dioxide generated by using energy is the greatest problem humankind faces in regards to the energy crisis. Accordingly, energy regulations of each country have been tightened day by day, and an energy rating system for home appliances is a permanent problem that manufacturers have. An energy rating system of a government which requires maximum efficiency while efficiently using less energy well accords with the needs of consumers who desire high internal capacity and low power consumption. Particularly, many studies on refrigerators have been performed for the past several decades, and studies for improving the efficiency of a cooling cycle, a compressor, a heat exchanger, and the like have reached their limit. Accordingly, recent studies on thermal loss are mainly performed, and many attempts to increase energy efficiency by strengthening insulation performance of refrigerators have been performed.

An insulating material such as an existing polyurethane has a heat conductivity of about 20 mk/m·K. When the insulating material is used, a thickness of an insulating wall of a refrigerator becomes greater so that storage capacity of the refrigerator is reduced. Accordingly, to solve these problems, it is necessary to use a vacuum insulation member having excellent insulation performance.

According thereto, an insulating wall of a refrigerator may be formed using a vacuum insulation member and a foam material including polyurethane. Here, an effective arrangement of the vacuum insulation member and the foam material in the insulating wall is an issue for increasing a storage capacity of the refrigerator while maintaining insulation performance and minimizing a thickness of the insulating wall.

SUMMARY

It is an aspect of the present invention to provide a refrigerator including an insulating wall having an improved structure with different thicknesses between a section including a vacuum insulation member and a section including a foam material for reducing a thickness of an insulating wall as well as maintaining insulation performance.

It is another aspect of the present invention to provide a refrigerator including an auxiliary vacuum insulation member having an improved structure in which a foam solution is foamed to form a foam material having a thin thickness.

In accordance with one aspect of the present invention, a refrigerator includes an inner casing which includes an opening and forms a storage compartment, an outer casing provided outside the inner casing, and an insulating wall formed by at least one of the inner casing and the outer casing to have a thickness. Here, the insulating wall includes a first insulating wall which extends from the opening and a second insulating wall which is located opposite the opening and meets the first insulating wall. The first insulating wall includes a first area adjacent to the opening and a second area which extends from the first area toward the second insulating wall, and a thickness of the first area is thicker than a thickness of the second area.

The insulating wall may include a vacuum insulation member disposed in a space provided between the inner casing and the outer casing and a foam material formed by being foamed in the space, and the first area may include a first part in which the vacuum insulation member is not disposed.

The first part may be provided between the opening and one side of the first area.

The inner casing and the outer casing may be assembled at the first part.

A maximum thickness formed at the first part may be a maximum thickness of the first insulating wall.

The first part may be formed to have a thickness between 30 mm and 55 mm.

The first area may further include a second part at which the vacuum insulation member and the foam material are arranged together.

A thickness of one side of the second part, which is adjacent to the first part, may be thicker than a thickness of the other side, which is adjacent to the second area.

The second area may include the vacuum insulation member in all sections thereof.

A thickness of the foam material formed in the second area may be between 5 mm and 10 mm.

A thickness of the foam material formed in the first area may thicker than a thickness of the foam material formed in the second area.

A difference between thicknesses of the first area and the second area may be formed by a step of the inner casing.

The first insulating wall may include a partition wall provided inside the storage compartment to divide the storage compartment into a refrigerator compartment and a freezer compartment, and a step at the partition wall may be formed toward at least one of the refrigerator compartment and the freezer compartment.

The insulating wall may further include a third area formed at a position at which the first insulating wall and the second insulating wall meet, and a thickness of the foam material at a part at which the third area and the first insulating wall meet may be at least the same as a minimum thickness of the foam material.

A thickness of the foam material at a part at which the third area and the second insulating wall meet may be at least the same as the minimum thickness of the foam material.

The third area may include a protruding portion which protrudes toward the storage compartment, and an auxiliary vacuum insulation member may be provided in a space inside the protruding portion.

The auxiliary vacuum insulation member may be located in a lateral direction of the storage compartment on the basis of the inner casing which forms the first insulating wall.

The auxiliary vacuum insulation member may not protrude toward the vacuum insulation member disposed inside the first insulating wall on the basis of the inner casing which forms the first insulating wall.

A reinforcing member may be provided inside the outer casing which forms the third area, and a thickness of the foam material formed in a space provided between the auxiliary vacuum insulation member and the reinforcing member may be thicker than a thickness of the foam material formed in the first area.

In accordance with one aspect of the present invention, a refrigerator includes an inner casing which includes an opening and forms a storage compartment, an outer casing provided outside the inner casing, and an insulating wall formed by at least one of the inner casing and the outer casing to have a thickness and configured to include a vacuum insulation member and a foam material disposed between the inner casing and the outer casing. Here, the insulating wall includes a first insulating wall which extends from the opening and a second insulating wall which is located opposite the opening and meets the first insulating wall. The first insulating wall includes a first area adjacent to the opening and a second area which extends from the first area toward the second insulating wall, and a thickness of the foam material formed in the first area is thicker than a thickness of the foam material formed in the second area.

The first area may include a first part in which the vacuum insulation member is not disposed, and the first part may be provided between the opening and one side of the first area.

A maximum thickness formed at the first part may be a maximum thickness of the first insulating wall.

The first part may be formed to have a thickness between 30 mm and 55 mm.

The first area may further include a second part at which the vacuum insulation member and the foam material are arranged together.

A thickness of the first area may be thicker than a thickness of the second area.

The second area may include the vacuum insulation member in all sections thereof.

A thickness of the foam material formed in the second area may be between 5 mm and 10 mm.

In accordance with one aspect of the present invention, a refrigerator includes a body including an opening at a front and includes an inner casing and an outer casing and an insulating wall formed by at least one of the inner casing and the outer casing to have a thickness and including a vacuum insulation member and a foam material thereinside. Here, the insulating wall includes a first insulating wall which forms a side surface of the body, a second insulating wall which forms a rear surface of the body, and a corner area formed at a position at which the first insulating wall and the second insulating wall meet each other. A thickness of the foam material at a part at which the corner area meets the first insulating wall or the second insulating wall is at least the same as a minimum thickness of the foam material.

The corner area may include a protruding portion which protrudes toward the inside of the body, and an auxiliary vacuum insulation member may be disposed at the protruding portion.

The auxiliary vacuum insulation member may be located toward the inside of the body on the basis of the inner casing which forms the first insulating wall or the inner casing which forms the second insulating wall.

The auxiliary vacuum insulation member may not protrude the vacuum insulation member disposed inside the first insulating wall and the second insulating wall on the basis of the inner casing which forms the first insulating wall and the inner casing which forms the second insulating wall.

In accordance with one aspect of the present invention, a refrigerator includes an inner casing which has an opening and forms a storage compartment, an outer casing which covers the inner casing and forms an exterior, and an insulating wall which is formed by at least one of the inner casing and the outer casing and includes a vacuum insulation member and a foam material. Here, the insulating wall includes a first insulating wall which includes one end extending from the opening and a second insulating wall which meets the other end of the first insulating wall and is located opposite the opening. The first insulating wall includes a first area which includes the one end of the first insulating wall and a second area which extends from the first area toward the second insulating wall and has a thickness smaller than a thickness of the first area. The vacuum insulation member is not disposed at least some sections of the first area and is disposed at all sections of the second area.

The first insulating wall may include a third area provided at a part at which the first insulating wall and the second insulating wall meet each other, and the third area may include an auxiliary vacuum insulation member provided to protrude toward the storage compartment.

At least a part of the auxiliary vacuum insulation member may be located at a position corresponding to at least a part of the vacuum insulation member on the basis of a thickness direction of the insulating wall.

A thickness of the foam material provided between the vacuum insulation member and the inner casing in the third area may be at least the same as a thickness of the foam material provided in the second area or on the second insulating wall.

In accordance with one embodiment of the present invention, a method of manufacturing a refrigerator which includes an inner casing having an opening and an outer casing provided outside the inner casing includes forming a first insulating wall which extends from the opening and forming a second insulating wall which is located opposite the opening and meets the first insulating wall. Here, the forming of the first insulating wall includes forming a first area adjacent to the opening and a second area which extends from the first area toward the second insulating wall, and a thickness of the first area is thicker than a thickness of the second area.

The thickness of the first area may be formed to be thicker than the thickness of the second area by bending the inner casing.

A vacuum insulation member may be attached to one surface of the outer casing, which faces the inner casing.

The method may include foaming a foam material in an internal space of the insulating wall such that a thickness of the foam material formed between the vacuum insulation member and the inner casing in the second area may be between 5 mm and 100 mm.

In accordance with one aspect of the present invention, a thin insulating wall is formed by disposing a vacuum insulation member and allowing a foam solution to be foamed to form a thin foam material in an overall space inside the insulating wall to maintain insulation performance, a thick foam material is formed at a part at which the vacuum insulation member is not disposed, and an auxiliary vacuum insulation member is disposed at a corner area of the insulating wall such that insulation performance of the entirety of a refrigerator may be maintained and reliability of the refrigerator may be secured.

BRIEF DESCRIPTION OF THE DRAWINGS

FIG. 1 is a perspective view illustrating an external shape of a refrigerator according to one embodiment of the present invention.

FIG. 2 is a side cross-sectional view of the refrigerator according to one embodiment of the present invention.

FIG. 3 is a view illustrating a configuration of an insulating wall of the refrigerator according to one embodiment of the present invention.

FIG. 4 is a cross-sectional view of the refrigerator according to one embodiment of the present invention.

FIG. 5 is a view schematically illustrating a cross section of the insulating wall of the refrigerator according to one embodiment of the present invention.

FIG. 6 is an enlarged cross-sectional view illustrating a part of the refrigerator according to one embodiment of the present invention.

FIG. 7 is a view illustrating conditions for obtaining a thickness of the insulating wall for preventing a dew formation phenomenon at the outer casing of the refrigerator according to one embodiment of the present invention.

FIG. 8 is a table illustrating calculated thicknesses of the insulating wall for preventing the dew formation phenomenon outside the refrigerator compartment according to one embodiment of the present invention.

FIG. 9 is a table illustrating the calculated thicknesses of the insulating wall for preventing the dew formation phenomenon outside the freezer compartment according to one embodiment of the present invention.

FIG. 10 is an enlarged cross-sectional view illustrating a part of the refrigerator according to another embodiment of the present invention.

FIG. 11 is an enlarged cross-sectional view illustrating a part of the refrigerator according to another embodiment of the present invention.

FIG. 12 is an enlarged cross-sectional view illustrating a part of the refrigerator according to another embodiment of the present invention.

FIG. 13 is an enlarged cross-sectional view illustrating a part of the refrigerator according to another embodiment of the present invention.

FIG. 14 is a cross-sectional view of the refrigerator according to another embodiment of the present invention.

FIG. 15 is a cross-sectional view of the refrigerator according to another embodiment of the present invention.

FIG. 16 is a cross-sectional view of the refrigerator according to another embodiment of the present invention.

FIG. 17 is a cross-sectional view of the refrigerator according to another embodiment of the present invention.

FIG. 18 is an enlarged view illustrating a cross section of a part of the refrigerator according to one embodiment of the present invention.

FIG. 19 is a schematic diagram illustrating a flow of a foam solution inside the refrigerator according to one embodiment of the present invention.

FIG. 20 is an enlarged view illustrating of a cross section a part of the refrigerator according to another embodiment of the present invention.

FIG. 21 is an enlarged view illustrating of a cross section of the part of the refrigerator according to another embodiment of the present invention.

FIG. 22 is an enlarged view illustrating of a cross section of the part of the refrigerator according to another embodiment of the present invention.

FIG. 23 is an enlarged view illustrating of a cross section of the part of the refrigerator according to another embodiment of the present invention.

FIG. 24 is a perspective view of a refrigerator according to another embodiment of the present invention.

FIG. 25 is a cross-sectional view of the refrigerator according to another embodiment of the present invention.

FIG. 26 is a perspective view of a refrigerator according to another embodiment of the present invention.

FIG. 27 is a cross-sectional view of the refrigerator according to another embodiment of the present invention.

DETAILED DESCRIPTION

The embodiments disclosed in the specification and the components shown in the drawings are merely preferable examples of the present invention and various modifications capable of replacing the embodiments and drawings of the specification may be made at the time of filing the present application.

Also, throughout the drawings of the present specification, like reference numerals or symbols refer to components or elements configured to perform substantially identical functions.

Also, the terms used herein are intended to explain the embodiments and are not intended to limit and/or define the present invention. Singular forms, unless defined otherwise in context, include plural forms. Throughout the specification, the terms "comprise," "have," and the like are used herein to specify the presence of stated features, numbers, steps, operations, elements, components or combinations thereof but do not preclude the presence or addition of one or more other features, numbers, steps, operations, elements, components, or combinations thereof.

Also, even though the terms including ordinals such as "first", "second", and the like may be used to describe various components, the components are not be limited by the terms, and the terms are used only for distinguishing one element from others. For example, without departing from the scope of the present invention, a first component may be referred to as a second component, and similarly, the second component may be referred to as the first component.

Also, the terms "front," "front surface," "rear," "rear surface," "top," and "bottom" are used on the basis of a front surface portion of a refrigerator according to one embodiment of the present invention shown in FIG. 1, that is, a side which faces frontward in FIG. 1.

FIG. 1 is a perspective view illustrating an external shape of a refrigerator according to one embodiment of the present invention, FIG. 2 is a side cross-sectional view of the refrigerator according to one embodiment of the present invention, FIG. 3 is a view illustrating a configuration of an insulating wall of the refrigerator according to one embodiment of the present invention, FIG. 4 is a cross-sectional view of the refrigerator according to one embodiment of the present invention, and FIG. 4 is a view schematically illustrating a cross section of the insulating wall of the refrigerator according to one embodiment of the present invention.

As shown in FIGS. 1 and 2, a refrigerator 1 may include a body 10 which forms an exterior and a storage compartment 20 provided in the body 10 to have an open front surface.

The body 10 may include an inner casing 40 which forms the storage compartment 20, an insulating wall 100 formed by an outer casing 50 which forms the exterior, and a cool air supplying device (not shown) which supplies cool air to the storage compartment 20.

The cool air supplying device may include a compressor C, a condenser (not shown), an expansion valve (not shown), an evaporator 26, an air blowing fan 27, and the like. Also, a vacuum insulation member (VIP) 200 provided to prevent an outflow of cool air of the storage compartment 20, and a foam material 210 formed by being foamed between the inner casing 40 and the outer casing 50 may be provided in the insulating wall 100.

A machine compartment 70 in which the compressor C configured to compress a refrigerant and the condenser configured to condense the compressed refrigerant are installed may be provided at a bottom of a rear of the body 10.

The storage compartment 20 is divided into a left side and a right side by a partition wall 17, 160 such that a refrigerator compartment 21 may be provided on the right side of the body 10 and a freezer compartment 22 may be provided on the left side of the body 10.

The refrigerator 1 may further include a door 30 which opens or closes the storage compartment 20.

The refrigerator compartment 21 and the freezer compartment 22 may be opened and closed by a refrigerator compartment door 31 and a freezer compartment door 33, which are pivotably coupled with the body 10, and a plurality of door guards 35 may be provided at rear sides of the refrigerator compartment door 31 and the freezer compartment door 33 to store food and the like.

The storage compartment 20 may include a plurality of racks 24 provided to divide the storage compartment 20 into a plurality of compartments, and stuffs such as food and the like are stacked on the racks 24.

Also, the storage compartment 20 may include a plurality of storage boxes 25 to be slidably inserted therein and withdrawn therefrom.

The refrigerator 1 may further include a hinge 38 to allow the door 30 to be pivotably coupled to the body 10.

As shown in FIG. 3, the insulating wall 100 may include an opening 13 formed at a front thereof, and may be provided to form the storage compartment 20 in addition to forming the exterior of the body 10. The insulating wall 100 is formed by the inner casing 40 and the outer casing 50 provided to cover the inner casing 40 outside the inner casing 40, as described above, but is not limited thereto and may be formed by any one of the inner casing 40 and the outer casing 50.

The insulating wall 100 may include a first insulating wall 110 configured to form a side surface of the body and extend from the opening 13 toward a rear of the refrigerator 1 and a second insulating wall 150 configured to meet the first insulating wall 110 at a rear side of the body 10 and form a rear surface of the body 10.

In detail, a top surface 51, a left side surface 52, and a right side surface 53 of the outer casing 50 may form the first insulating wall 110, and a rear surface 54 of the outer casing 50 may form the second insulating wall 150.

Also, the insulating wall 100 may include the partition wall 160 configured to divide the refrigerator compartment 21 and the freezer compartment 22 in the storage compartment 20. The partition wall 160 may be formed by the inner casing 40, and may include the vacuum insulation member 200 and the foam material 210 like the insulating wall 100.

It is necessary for the insulating wall 100 to minimize a thermal loss of the storage compartment 20 in addition to maintaining rigidity of the entire refrigerator 1 by securing a certain degree of insulation performance.

Accordingly, the insulating wall 100 has to be formed to maintain a certain thickness. However, when the thickness of the insulating wall 100 is provided to be too thick in consideration of heat-insulation performance and strength, a capacity of the storage compartment 20 is reduced, which may become a problem.

Accordingly, it is necessary to reduce the thickness of the insulating wall 100 to maximize the storage capacity of the storage compartment 20 within a range in which insulation performance and rigidity are maintained.

For this, as shown in FIG. 4, the vacuum insulation member 200 which has excellent heat insulation performance and the foam material 210 formed by being foamed in a foam space S formed between the inner casing 40 and the outer casing 50 may be provided between the inner casing 40 and the outer casing 50.

In detail, the foam material 210 may be formed to have a thickness of 5 mm to 10 mm to simultaneously form the insulating wall 100 having an ultrathin thickness and dispose the vacuum insulation member 200 on each of the surfaces which form the outer casing 50, that is, the top surface 51, both side surfaces 52 and 53, and the rear surface 54 of the outer casing 50 such that the insulating wall 100 may be formed to secure insulation performance.

The foam material 210 is formed by a foam solution being filled in a space between the inner casing 40 and the outer casing 50. In detail, in a process of manufacturing the refrigerator 1, the inner casing 40 and the outer casing 50 are assembled and then a foam solution is foamed in the space between the inner casing 40 and the outer casing 50 through a foam solution inlet (not shown) provided at a machine compartment cover 71 which covers the machine compartment 70.

That is, the foam solution flows through the foam solution inlet (not shown) provided at one side of the second insulating wall 150 and flows toward a peripheral side of the second insulating wall 150 such that the foam solution flows into and is filled in the first insulating wall 110.

The foam solution flows toward and is filled in the foam space S in which the vacuum insulation member 200 is not located such that an inside of the insulating wall 100 is formed. Particularly, when the vacuum insulation member 200 is provided to come into contact with the outer casing 50, the foam space S may be generally provided between the vacuum insulation member 200 and the inner casing 40.

Here, to form the above-described ultrathin insulating wall 100, a thickness of the foam material 210 formed in the insulating wall 100 may be restricted to be from 5 mm to 10 mm.

Accordingly, a thickness of the foam space S in which the foam solution flows, that is, a distance between the vacuum insulation member 200 and the inner casing 40, is formed as described above such that the foam solution may not smoothly flow.

Accordingly, a problem in which the entire foam space S is not uniformly filled with the foam solution may occur, but such a problem may be solved by an improved arrangement of the vacuum insulation member 200 which will be described below.

The vacuum insulation member 200 provided on the ultrathin insulating wall 100 may be attached to an inside of the outer casing 50. This is to allow the above-described foam solution to smoothly flow and additionally to provide the insulating wall 100 having a thin thickness.

In detail, as shown in FIGS. 2 and 4, the vacuum insulation member 200 may be attached to and disposed on each of the top surface 51, the left side surface 52, the right side surface 53, and the rear surface 54. Accordingly, the vacuum insulation member 200 and the foam material 210 may be arranged on both the first insulating wall 110 and the second insulating wall 150.

However, the vacuum insulation member 200 is not limited to one embodiment of the present invention and may be attached to the inside of the inner casing 40. However, since the inner casing 40 forms the storage compartment 20, a rather large number of curved parts or uneven parts are included depending on a shape of the storage compartment 20 such that a surface in contact with the vacuum insulation member 200 may not be secured when compared to the outer casing 50.

Accordingly, when the vacuum insulation member 200 is disposed on the inner casing 40, reliability thereof may be decreased more than a case of being disposed on the outer casing 50.

Also, since the vacuum insulation member 200 may be attached to the outer casing 50 in a plate shape before the outer casing 50 is processed to be in the exterior shape of the body 10 and the outer casing 50 may then be processed to be in the exterior shape of the body 10, a process of manufacturing the refrigerator 1 may be easily performed. Also, the vacuum insulation member 200 is attached before the outer casing 50 is assembled with the inner casing 40 such that the process of manufacturing the refrigerator 1 may be easily performed.

In the manufacturing process, the vacuum insulation member 200 is adhered to one surface of the outer casing 50, which faces the inner casing 40, when the outer casing 50 has a plate shape before having a bent shape. Afterward, a shape of the inner casing 40 and a shape of the outer casing 50 may be processed to be the same when the outer casing 50 is bent.

The inner casing 40 may include the opening 13 and may be processed to have an approximate hexahedron shape to form the storage compartment 20. With respect to this, the above-described outer casing 50 is disposed on and assembled with an outer surface of the inner casing to form the insulating wall 100.

A section of the inner casing 40, corresponding to the first insulating wall 110, may have a bent section due to a step portion 43 which will be described below, and the first insulating wall 110 may include a first area 120 and a second area 130 due to the bent section. The step portion 43 of the inner casing 40 may be formed by being processed before being assembled with the outer casing 50.

After a process of assembling the inner casing 40 with the outer casing 50 is finished, a space between the inner casing 40 and the outer casing 50, that is, an inside of the insulating wall 100, may be filled with the foam material 210.

That is, a process in which the inner casing 40 processed to include the step portion 43 and the outer casing 50 to which the vacuum insulation member 200 is attached are assembled and then the foam material 210 is foamed in the space between the inner casing 40 and the outer casing 50 is performed.

Since the partition wall 160 is formed of only the inner casings 40, the partition wall 160 may be formed by attaching the vacuum insulation member 200 to at least one surface of the facing inner casings 40 which form the partition wall 160. Here, the vacuum insulation member 200 is attached, and then the foam material 210 is formed at another part of an inner space of the partition wall 160. Also, particularly, the foam material 210 may be formed to have a thickness of 5 mm to 10 mm as described above between the vacuum insulation member 200 and the inner casing such that a capacity of the storage compartment 20 may be increased.

The vacuum insulation members 200 disposed on the first insulating wall 110 may be arranged on the top surface 51 and the side surfaces 52 and 53, and may be provided to extend to a position adjacent to one end 111 of the first insulating wall 110 configured to extend from the opening 13.

Here, the outer casing 50 and the inner casing 40 may be assembled at the one end 111 of the first insulating wall 110. In detail, an outer casing flange 50a and an inner casing flange 40a provided at the outer casing 50 and the inner casing 40, respectively, may be coupled at the one end 111.

The outer casing flange 50a and the inner casing flange 40a extend into the first insulating wall 110 and are coupled to the one end 111 toward the inside of the first insulating wall 110, and a hot pipe 250 may be mounted between the outer casing flange 50a and the inner casing flange 40a.

Other components in addition to the vacuum insulation member 200 and the foam material 210 may be arranged on the one end 111 as described above. Accordingly, a space for arranging the above-described components may be further needed inside the first insulating wall 110.

For his, the vacuum insulation member 200 may not be disposed in an area of the first insulating wall 110 adjacent to the one end 111, and a thickness of the foam material 210 may be more increased, which will be described below in detail.

FIG. 5 is a view schematically illustrating a cross section of the insulating wall of the refrigerator according to one embodiment of the present invention, FIG. 6 is an enlarged cross-sectional view illustrating a part of the refrigerator according to one embodiment of the present invention, FIG. 7 is a view illustrating conditions for obtaining a thickness of the insulating wall for preventing a dew formation phenomenon at the outer casing of the refrigerator according to one embodiment of the present invention, FIG. 8 is a table illustrating calculated thicknesses of the insulating wall for preventing the dew formation phenomenon outside the refrigerator compartment according to one embodiment of the present invention, and FIG. 9 is a table illustrating the calculated thicknesses of the insulating wall for preventing the dew formation phenomenon outside the freezer compartment according to one embodiment of the present invention.

Referring to FIG. 6, as described above, the one end 111 of the first insulating wall 110 may be a position at which the top surface 51 and the side surfaces 52 and 53 of the outer casing 50 are assembled with the inner casing 40 corresponding thereto.

In detail, a part of the one end 111 may be formed of the outer casing 50, and another part thereof may be formed of the inner casing. A front portion 50' of the outer casing 50, which forms an outside of the insulating wall 100 and extends toward the one end 111, and a front portion 40' of the inner casing 40, which forms the inside of the insulating wall 100 and extends toward the one end 111, may be coupled at the one end 111 and may form the insulating wall 100.

The inner casing flange 40a which extends from the front portion 40' of the inner casing 40 and the outer casing flange 50a which extends from the front portion 50' of the outer casing 50 may overlap and may be assembled at the one end 111.

Here, the flanges 40a and 50a may extend toward the inside of the first insulating wall 110, and the hot pipe 250 may be mounted in a space formed by combining the flanges 40a and 50a.

As described above, since the components such as the inner casing flange 40a, the outer casing flange 50a, and the hot pipe 250 may be additionally arranged inside the first insulating wall 110 adjacent to the one end 111, a space in which the above-described components may be arranged is necessary.

However, since the insulating wall 100 of the refrigerator 1 according to the concept of the present invention is formed to have an ultrathin shape, the shape may cause a problem in securing a space inside the first insulating wall 110 adjacent to the one end 111.

To solve the problem, the vacuum insulation member 200 may not be disposed in an area of the first insulating wall 110 adjacent to the one end 111. Since the vacuum insulation member 200 is not disposed, a space for assembling the outer casing flange 50a and the inner casing flange 40a may be secured inside the one end 111.

Since insulation performance of the vacuum insulation member 200 is more better than insulation performance of the foam material 210, a problem related to insulation performance may additionally occur in the area of the first insulating wall 110 adjacent to the one end 111, in which the vacuum insulation member 200 is not included.

When the heat performance is decreased, a temperature in the storage compartment 20 is transferred to the insulating wall 100 such that a temperature of the outside of the insulating wall 100, that is, the outer casing 50, is decreased and a dew formation phenomenon may occur at the outer casing 50.

Particularly, since the one end 111 includes a part adjacent to the opening and temporarily opened to or closed from outdoor air depending on opening or closing of the door 30, a heat bridge may occur.

To prevent the dew formation phenomenon which occurs at the one end 111 and the area of the first insulating wall 110 adjacent to the one end 111, it is necessary to secure a certain degree of insulation performance. Here, when the vacuum insulation member 200 is not disposed inside the insulating wall 100, the insulation performance of the insulating wall 100 may be secured by increasing the thickness of the foam material 210.

Accordingly, as shown in FIGS. 5 and 6, a thickness D1 of the foam material 210 formed in an area in which the vacuum insulation member 200 is not disposed is thicker than a thickness D5 of a space in which the vacuum insulation member 200 is disposed, and the thickness of the entire insulating wall 100 may partially differ.

Accordingly, the first insulating wall 110 may include the first area 120 which extends from the one end 111 and includes at least a part at which the vacuum insulation member 200 is not disposed, and the second area 130 which extends from the first area 120 toward the second insulating wall 150 and has thicknesses D2 and D3 thinner than the thickness D1 of the first area 120.

The insulating wall 100 of the refrigerator 1 according to the concept of the present invention is formed to have an overall ultrathin wall shape, and the vacuum insulation member 200 and the foam material 210 having the thin thicknesses D2 and D3 within 5 mm to 10 mm may be provided in the second area 130 and the second insulating wall 150 except the first area 120.

However, as described above, the first area 120 may include a part without the vacuum insulation member 200 inside the first area 120 to secure a uniform internal space, and may include the foam material 210 formed to be thick to replace the insulation performance of the vacuum insulation member 200 to prevent a heat bridge from occurring at the one end 111 side.

As described above, since the insulating wall 100 according to the concept of the present invention is provided to have an ultrathin wall shape, it is necessary to form the thickness D1 of the first area 120 to be a minimum thickness D1 for maintaining insulation performance and at least preventing the dew formation phenomenon from occurring.

Accordingly, the minimum thickness D1 of the insulating wall 100 which prevents the occurrence of the dew formation phenomenon may be determined according to the following equation. $T_3 = h_0(T_1-T_2)/h_t - L = k(T_2-T_3)/h_a(T_1-T_2)$ As shown in FIG. 7, in the above equation, $T_1$ is an external temperature. $T_2$ is s surface temperature of the outer casing 50, $h_0$ is a surface heat transfer coefficient of the outer casing 50, $T_3$ is a surface temperature of the inner casing 40, $T_4$ is an internal temperature of the storage compartment 20, $h_1$ is a surface heat transfer coefficient of the inner casing 40, and L is a thickness of the first area 120.

Referring to tables shown in FIGS. 8 and 9, minimum thicknesses D1 at which dew formation does not occur in positions of the first area 120 provided to be adjacent to the refrigerator compartment 21 and the freezer compartment 22 may be 30 mm and 54 mm, respectively, according to the above equation.

Accordingly, the thickness D1 of the first area 120 may be formed to be within about 30 mm to 60 mm.

The above thickness, as described above, is the minimum thickness D1 necessary in only a section of the insulating wall 100 formed of only the foam material 210, in which the vacuum insulation member 200 is not disposed. When the vacuum insulation member 200 is disposed, due to excellent insulation performance of the vacuum insulation member 200, the thicknesses D2 and D3 of the insulating wall 100 in which the vacuum insulation member 200 is disposed may be formed to be thinner.

To secure the capacity of the storage compartment 20 and form the insulating wall 100 having a thin thickness, the thicknesses D2 and D3 of the insulating wall 100 side in which the vacuum insulation member 200 is disposed may be formed to be about 30 mm or less.

In detail, the thickness D2 of the second area 130 provided at the refrigerator compartment 21 side may be formed to be 20 mm or less, and preferably, may be formed to be 19 mm, and the thickness D3 of the second area 130 provided at the freezer compartment 22 side may be formed to be 30 mm, and preferably, may be formed to be 26 mm.

Also, the first area 120 provided at the partition wall 160 may have the thickness D1 within 30 mm to 55 mm, and the thickness D4 of the second area 130 may be formed to be 30 mm or less.

A difference between the above-described thicknesses of the first area 120 and the second area 130 may be formed by the step of the inner casing 40, as shown in FIG. 6. That is, the outer casing 50 may be formed in a hexahedral casing shape which forms an exterior of the body 10, and a thickness difference of the insulating wall 100 may be determined by a distance between the outer casing 50 and the corresponding inner casing 40.

Accordingly, the inner casing 40 may include the step portion 43 configured to extend in a direction perpendicular to a longitudinal direction in which the inner casing 40 extends or another direction.

The step portion 43 is located at a position which divides the first area 120 from the second area 130 such that thicknesses of the first area 120 and the second area 130 may be formed to be different. That is, areas of the first area 120 and the second area 130 may be divided by the step portion 43.

An area from the one end 111 of the first insulating wall 110 to the step portion 43, which has a thickness increased by the step portion 43, may be designated as the first area 120, and an area of the first insulating wall 110 from the step portion 43, which meets the second insulating wall 150, may be designated as the second area 130.

The step portion 43 according to one embodiment of the present invention may be provided in the direction perpendicular to the longitudinal direction in which the first insulating wall 110 extends. Accordingly, the area from the step portion 43 to the one end 111 may be designated as the first area and may be formed to have the uniform thickness D1 of 30 mm to 55 mm from the step portion 43 to the one end 111, and the area from the step portion 43 to a section which meets the second insulating wall 150 may be designated as the second area 130 and may also be formed to have the uniform thicknesses D2 and D3 of 10 mm to 30 mm.

However, unlike one embodiment of the present invention, the step portion 43 is not limited to a shape perpendicular to the longitudinal direction, and may be formed in a variety of shapes. Hereinafter, a variety of shapes of the step portion 43 will be described in detail. Since other components in addition to components of step portions 43a, 43b, 43c, and 43d, which will be described below, are identical to those of the above-described one embodiment, descriptions thereof ill be omitted.

FIGS. 10 to 13 are enlarged views of a cross section of a refrigerator according to another embodiment of the present invention.

Referring to FIG. 9, the first area 120 may include a first part 113 in which the vacuum insulation member 200 is not disposed and a second part 114 in which the vacuum insulation member 200 is disposed.

The first part 113 is a part of the first area 120 in which the inner casing 40 and the outer casing 50 are substantially assembled, the hot pipe 250 is mounted, a certain-sized space inside the insulating wall 100 is necessary, and the vacuum insulation member 200 is not disposed to secure a space.

Accordingly, the first part 113 is a part of the insulating wall 110, which has a thickest thickness D1, and a part at which the thickness D1 of the first part 113 is thickest may be the maximum thickness of the first insulating wall 100.

Unlike this, the vacuum insulation member 200 may be disposed on the second part 114. The second part 114 may be formed to be an ultrathin wall shape like the second area 130, but may be formed to have a thickness thicker than the thickness D2 of the second area 130 because the second part 114 may be considered as a buffering part between the first part 113 and the second area 130.

The above-described step portion 43 may be provided on the second part 114 such that the first area 120 and the second area 130 may be divided from each other. Since a thickness of the foam material 210 is changed by the step portion 43 such that insulation performance is changed, the step portion 43 may be provided at a part at which the vacuum insulation member 200 is disposed such that insulation performance of the insulating wall 100 may be maintained at a certain level.

As described above, the step portion 43 may be formed in a direction perpendicular to the direction in which the first insulating wall 110 extends, and may distinguish the first area 120 from the second area 130.

However, the step portion 43 is not limited to one embodiment of the present invention and may be formed in a variety of shapes, as shown in FIGS. 10 to 13.

As shown in FIG. 10, the step portion 43a may extend in a direction perpendicular to the first insulating wall 110 and may be provided to have a bent part in a round shape.

Also, as shown in FIG. 11, the step portion 43b may extend in a round shape. In detail, the step portion 43b may have a convex round shape from the second area 130 toward the inside of the storage compartment 20, and may be connected to the first area 120.

Also, as shown in FIG. 12, the step portion 43c may extend in a diagonal shape. In detail, the step portion 43c may have a diagonal shape from the second area 130 to the inside of the storage compartment 20, and may be connected to the first area 120.

Also, as shown in FIG. 13, the step portion 43d may be provided including a plurality of steps. That is, the step portion 43d may be provided to have a stair form toward the inside the storage compartment 20, and may connect the second area 130 and the first area 120.

Hereinafter, the first area 120 provided at the partition wall 160 will be described in detail. Since components in addition to components of the first area 120 and an inner casing surface 40' are identical to those of the above-described one embodiment, descriptions thereof will be omitted.

FIGS. 14 to 16 are cross-sectional views of the refrigerator according to another embodiment of the present invention.

As shown in FIG. 5, the first area 120 provided at the partition wall 160 may be provided by the inner casing 40 and may be formed to secure the thickness D1 by providing any one of inner casings 40, which face each other, to protrude inside the storage compartment 20.

In detail, the inner casing surface 40' of the inner casing which forms the first area 120 provided at the partition wall 160, which is provided at the freezer compartment 22 side, is formed to protrude inside the freezer compartment 22 such that a thickness of the first area 120 may increase relative to the second area 130.

That is, the step formed between the first area 120 and the second area 130 is formed inside the freezer compartment 22 such that the step portion 43 may also be provided inside the freezer compartment 22.

However, a position of the step portion 43 is not limited to one embodiment of the present invention and may vary.

As shown in FIG. 14, the step portion 43 may be disposed at the refrigerator compartment 21 side. In detail, the inner casing surface 40' of the inner casing which forms the first area 120 provided at the partition wall 160, which is provided at the refrigerator compartment 21 side, is formed to protrude inside the refrigerator compartment 21 such that the thickness of the first area 120 may become thick.

Also, as shown in FIG. 15, a plurality of such step portions 43 may be provided and arranged in the refrigerator compartment 21 and the freezer compartment 22. In detail, a pair of such inner casing surfaces 40' which form the first area 120 are arranged in and protrude toward the refrigerator compartment 21 and the freezer compartment 22 such that the thickness of the first area 120 may become thick.

Also, as shown in FIG. 16, the first area 120 may have the same thickness as the second area 130. Since the partition wall 160 is not directly exposed outward except the one end 111, the first area 120 provided on the partition wall 160 may be provided to be thinner than thicknesses of the first area 120 provided on the top surface 51 and the left and right side surfaces 52 and 53, which come into contact with outside air.

Hereinafter, a first area 120 according to another embodiment of the present invention will be described. Since other components in addition to components of the first area 120, which will be described below, are identical to those of the above-described one embodiment, descriptions thereof will be omitted.

FIG. 17 is a cross-sectional view of the refrigerator according to another embodiment of the present invention.

According to the above-described one embodiment of the present invention, the first area 120 and the second area 130 may maintain insulation performance of the first area 120 and the second area 130 only by a thickness difference.

To maintain overall insulation performance of an insulating wall, while not limited to the embodiment of the present invention, as shown in FIG. 17, overall insulation performance may be maintained using only a thickness difference of the foam material 210 formed by being foamed between the first area 120 and the second area 130 while thicknesses of the first area 120 and the second area 130 are maintained.

Since the thickness D1 of the first area 120 according to the above-described embodiment is thicker than the thicknesses D2 and D3 of the second area 130, a problem in which a size of the opening is reduced by an increased thickness in addition to a capacity of the storage compartment 20 on a side corresponding to the first area 120 not increasing occurs.

To solve the problem, insulation performance of the whole insulating wall may be maintained using a thickness difference of the foam material 210 disposed thereinside by using the foam material 210 having more excellent insulation performance than that of a polyurethane foam material 210 that is generally used now while maintaining the thicknesses D1, D2, D3, and D4 of the first area 120 and the second area 130.

Hereinafter, a third area 180 formed at a position at which the first insulating wall 110 and the second insulating wall 150 meet will be described in detail.

FIG. 18 is an enlarged view illustrating a cross section of a part of the refrigerator according to one embodiment of the present invention, and FIG. 19 is a schematic diagram illustrating a flow of the foam solution inside the refrigerator according to one embodiment of the present invention.

The first insulating wall 110 and the second insulating wall 150 may meet on the rear surface of the body 10 and form the rectangular-shaped insulating wall 100. In detail, the first insulating wall 110 comes into contact with the rear surface 54 and meets the second insulating wall 150 on each of the top surface 51, the left side surface 52, and the right side surface 53.

Here, the third area 180 may be formed at a position at which the left side surface 52, the right side surface 53, and the rear surface 54 meet (refer to FIG. 4) in the position at which the first insulating wall 110 and the second insulating wall 150 meet.

The third area 180 may be referred to as a bar corner area which forms a corner part 55 of a side at which the side surfaces 52 and 53 and the rear surface 54 meet.

The third area 180 may be formed at the position at which the first insulating wall 110 and the second insulating wall 150 meet as well as a part at which the outer casing 50 and the inner casing 40 form a bend. The outer casing 50 which forms the insulating wall 100 is formed by bending a single plate to have a hexahedral shape, and a reinforcing member 240 may be provided inside a bent portion to secure rigidity of the outer casing 50.

That is, the reinforcing member 240 having a bent shape corresponding to the bent corner part 55 is provided inside the third area 180 such that rigidity of the outer casing 50 and the overall insulating wall 100 may be maintained.

Vacuum insulation members 200 arranged on the first insulating wall 110 and the second insulating wall 150 may be disposed on inside surfaces of the left and right side surfaces 52 and 53 and the rear surface 54 and provided to extend to parts adjacent to the corner part 55, and the reinforcing member 240 may be disposed between the vacuum insulation members 200.

The storage compartment 20 may minimize an outward heat loss due to the vacuum insulation members 200 being arranged on the first insulating wall 110 and the second insulating wall 150. However, since all sections in the storage compartment 20 are not covered by the vacuum insulation members 200, the vacuum insulation member 200 is not disposed between the storage compartment 20 and the outside in some areas of the storage compartment 20 such that insulation performance may be deteriorated.

In detail, since it is impossible to attach the vacuum insulation member 200 to the outer casing 50 in a section in which the above-described reinforcing member 240 is provided, the storage compartment 20 may not be covered by the vacuum insulation member 200 in the section in which the reinforcing member 240 is located.

Accordingly, to extend a section A in which insulation performance is maintained by the vacuum insulation member 200, an auxiliary vacuum insulation member 220 disposed adjacent to the inner casing 40 may be provided in the third area 180.

Since the reinforcing member 240 is provided on the outer casing 50 side in the third area 180 as described above, the vacuum insulation member 200 disposed on the left and right side surfaces 52 and 53 or the rear surface 54 may extend along an inside surface of the outer casing 50.

Accordingly, the auxiliary vacuum insulation member 220 may be disposed on the inner casing 40 in the third area 180. In detail, the auxiliary vacuum insulation member 220 may be disposed on a surface of the inner casing 40, which faces the outer casing 50.

Since the auxiliary vacuum insulation member 220 is disposed inside the inner casing 40 which forms the third area 180, a protruding portion 181 which protrudes inside the storage compartment 20 to secure a space in which the auxiliary vacuum insulation member 220 is located is included.

The protruding portion 181 may extend from a corner side formed by the inner casing 40 corresponding to each of the left and right side surfaces 52 and 53 and the rear surface 54 toward the inside of the storage compartment 20.

The protruding portion 181 may extend from the inner casing 40, which forms the first insulating wall 110 and the second insulating wall 150, in a direction diagonal to the inner casing 40 on the first insulating wall 110 and the inner casing 40 on the second insulating wall 150 provided to be perpendicular thereto to protrude inside the storage compartment 20.

A space may be formed between the inner casing 40 and the outer casing 50 in the third area 180 by as much as the protruding portion 181 protrudes, and the auxiliary vacuum insulation member 220 may be disposed in this space.

When the auxiliary vacuum insulation member 220 is not present on the basis of the first insulating wall 110, an area in which an insulation property of the storage compartment 20 is secured by the vacuum insulation member 200 is limited to an area A1, but an area in which the insulation property of the storage compartment 20 is secured may extend to an area A2 by the auxiliary vacuum insulation member 220 being provided.

That is, a part of the storage compartment 20 adjacent to the corner part 55 may be exposed to a part in which insulation performance is not maintained because the vacuum insulation member 200 does not extend to the corner part 55. However, the auxiliary vacuum insulation member 220 is disposed in the third area 180 such that the vacuum insulation member 200 and the auxiliary vacuum insulation member 220 may be provided to be arranged on an overall outer perimeter of the storage compartment 20.

Additionally, an area A3, which is an area in which the vacuum insulation member 200 and the auxiliary vacuum insulation member 220 are redundantly provided, may be formed. The area A3 is an area in which a plurality of such vacuum insulation members 200 are provided and may have more excellent insulation performance than that of the area A1 or the area A2.

Although the area A1 and the area A2 may be continuously formed without overlap in the first insulating wall 110, the area A3, which is a region in which the vacuum insulation member 200 overlaps the auxiliary vacuum insulation member 220, may be at least partially provided in at least some sections of the first insulating wall 110, as shown in FIG. 18.

The auxiliary vacuum insulation member 220 may be provided such that a distance D6 between the vacuum insulation member 200 and the auxiliary vacuum insulation member 220 may be at least the same as that of a distance D5 between the vacuum insulation member 200 disposed in the first area 120 and the inner casing 40 corresponding thereto or a distance D5 between the vacuum insulation member 200 disposed on the second insulating wall 150 and the inner casing 40 corresponding thereto.

That is, in the first area 120, the distance D5 between the vacuum insulation members 200 disposed on the left and right side surfaces 52 and 53 and the inner casing 40 provided corresponding to the left and right side surfaces 52 and 53 may be the same or shorter than the distance D6 between the auxiliary vacuum insulation member 220 and the vacuum insulation members 200 disposed on the left and right side surfaces 52 and 53.

Also, on the second insulating wall 150, the distance D5 between the vacuum insulation member 200 disposed on the rear surface 54 and the inner casing 40 provided corresponding to the rear surface 54 may be the same or shorter than the distance D6 between the auxiliary vacuum insulation member 220 and the vacuum insulation members 200 disposed on the rear surface 54.

This is to secure a flow path to allow the foam solution for forming the foam material 210 to smoothly flow when the foam solution is injected, as shown in FIG. 19.

The foam material 210 is formed by the foam solution being filled in a space between the inner casing 40 and the outer casing 50. In detail, during a process of manufacturing the refrigerator 1, after the inner casing 40 and the outer casing 50 are assembled, the foam solution is foamed inside the space between the inner casing 40 and the outer casing 50 through a foam solution inlet (not shown) provided at the machine compartment cover 71 which covers the machine compartment 70 (refer to FIG. 2).

The foam solution flows to be filled in the foam space S in which the vacuum insulation member 200 and the auxiliary vacuum insulation member 220 are not located such that the inside of the insulating wall 100 is formed.

Here, as the thicknesses of the foam material 210 provided in the second area 130 of the refrigerator 1 which includes the ultrathin wall type insulating wall 100 and between the vacuum insulation member 200 of the second insulating wall 150 and the inner casing 40 are restricted to be 5 mm to 10 mm, a width of the foam space S to which the foam solution flows is formed, and thus the foam solution does not smoothly flow.

In a process of manufacturing the refrigerator 1, the foam solution is foamed on one side of the rear surface 54 and may pass through the corner part 55 along the inside of the second insulating wall 150 and flow inside the first insulating wall 110 to be filled in the entirety of the insulating wall 100, as shown in FIG. 19.

Here, the foam solution is filled along the foam space S configured to generally have as much width as the distance D5. Since the distance D5 is formed to be relatively short and between 5 mm to 10 mm as described above, when a part of the flow path is restricted, a flow of the foam solution is poor and the foam solution cannot be evenly filled in the entirety of the insulating wall 100 such that a problem may occur with respect to the reliability of the refrigerator 1.

Particularly, when the foam solution does not smoothly flow in the third area provided between the second insulating wall 150 and the first insulating wall 110, the first insulating wall 110 is not completely filled with the foam material, and thus difficulty may occur in forming the foam material 210.

Due to this, the distance D6 between the vacuum insulation member 200 and the auxiliary vacuum insulation member 220, which is a minimum width of the foam space S in which the foam solution flows through the third area 180, may be provided to be at least the same as the distance D5 of with the width of the foam space S in which the foam solution flows inside the second insulating wall 150 such that the flow of the foam solution may not be restricted.

Accordingly, the foam solution which flows inside the second insulating wall 150 may smoothly flow into the third area 180, pass through the third area 180, and flow toward the first insulating wall 110.

Also, the distance D6 between the vacuum insulation member 200 and the auxiliary vacuum insulation member 220, which is the width of the foam space S in which the foam solution flows through the third area 180, may be provided to be at least the same as the distance D5 of with the width of the foam space S in which the foam solution flows inside the first insulating wall 110 such that the foam solution which passes through the third area 180 may be allowed to smoothly flow.

For this, a cross section of the auxiliary vacuum insulation member 220 may be provided to have a trapezoidal shape which includes a bottom side 221 having a length corresponding to the protruding portion 181, a top side 222 shorter than the bottom side 221, and a pair of oblique sides which connect the bottom side 221 to the top side 222. Accordingly, the auxiliary vacuum insulation member 220 may have a trapezoidal prism which has a trapezoidal cross section and extends in frontward and rearward directions of the refrigerator 1.

Accordingly, the distance D6 may be substantially designated as a distance between the vacuum insulation members 200 arranged on the oblique sides 223, the first insulating wall 110, and the second insulating wall 150. Accordingly, the oblique sides 223 of the cross section of the auxiliary vacuum insulation member 220 may be provided at a certain angle θ to allow the distance D6 to be the same as or greater than the distance D5.

Like one embodiment of the present invention, the oblique sides 223 may be provided in directions in which the inner casings 40 which form the first insulating wall 110 and the second insulating wall 150 extend such that the oblique sides 223 and the inner casings 40 may be linearly provided.

When the oblique side 223 and the inner casing 40 are collinearly provided, the distances D5 and D6 may be provided to be the same such that the foam solution may smoothly flow.

The oblique side 223 is not limited to one embodiment of the present invention, and may be provided not to be collinear with the inner casing 40. In detail, the oblique side 223 may be provided to be tilted toward the storage compartment 20 with respect to an extension direction of the inner casing 40. That is, the angle θ between each of the oblique sides 223 and the bottom side 221 may be provided to be smaller than that of a case in which the oblique side 223 and the inner casing 40 is linearly provided.

When the angle θ between the oblique side 223 and the bottom side 221 is reduced to be smaller than the angle θ between the oblique side 223 and the bottom side 221 shown in FIG. 19, the oblique side 223 extends in a direction in which a length of the top side 222 is reduced such that the oblique side 223 is disposed to be far from the vacuum insulation member 200 and the distance D6 is further increased.

Hereinafter, auxiliary vacuum insulation members 220a, 220b, and 220c according to other embodiments of the present invention will be described. Since other components in addition to components of the auxiliary vacuum insulation members 220a, 220b, and 220c, which will be described below, are identical to those of the above-described one embodiment, descriptions thereof will be omitted.

FIGS. 20 to 22 are enlarged views illustrating parts of cross sections of refrigerators according to other embodiments of the present invention.

As shown in FIG. 20, the auxiliary vacuum insulation member 220a may be provided to have a triangular-shaped cross section. The triangular-shaped cross section of the auxiliary vacuum insulation member 220a may be formed by two bottom sides 221a and a hypotenuse 223a which connects the two bottom sides 221a.

That is, the auxiliary vacuum insulation member 220a according to another embodiment of the present invention may have a triangular prism which has a triangular-shaped cross section and extends in frontward and rearward directions of the refrigerator 1.

Accordingly, the distance D6 may be designated as a distance between the hypotenuse 223a and each of the vacuum insulation members 200 arranged on the first insulating wall 110 and the second insulating wall 150. Accordingly, the distance D6 may be provided to be at least the same as the distance D5, and may be provided along the hypotenuse to be longer than the distance D5.

As shown in FIG. 20, the two bottom sides 221a may form a right angle while having the same size, but are not limited thereto, and may have different lengths or may be at another angle instead of a right angle.

The protruding portion 181 may be provided to have a shape corresponding to the two bottom sides of the auxiliary vacuum insulation member 220a and protrude inside the storage compartment 20. The protruding portion 181 may extend to protrude in a right-angled shape between the inner casings 40 which form the first insulating wall 110 and the second insulating wall 150.

The protruding portion 181 is not limited to protruding in the right-angled shape as shown in FIG. 20, and may be formed corresponding to the shape of the auxiliary vacuum insulation member 220a.

As shown in FIG. 21, the auxiliary vacuum insulation member 220b may be provided to have a quadrangular-shaped cross section. The quadrangular-shaped cross section of the auxiliary vacuum insulation member 220b may be formed of two bottom sides 221a and opposite sides 223b corresponding to the two sides 221b in parallel.

That is, the auxiliary vacuum insulation member 220b according to another embodiment of the present invention may have a quadrangular prism which has a quadrangular-shaped cross section and extends in the frontward and rearward directions of the refrigerator 1.

Accordingly, the distance D6 may be designated as a distance between the opposite side 223b and each of the vacuum insulation members 200 arranged on the first insulating wall 110 and the second insulating wall 150. Accordingly, the distance D6 may be provided to be the same as the distance D5.

As shown in FIG. 22, the auxiliary vacuum insulation member 220c may be provided to have a circular-shaped cross section. The circular cross section of the auxiliary vacuum insulation member 220c may be formed to have a diameter with a protruding length of the protruding portion 181 inside the storage compartment 20 as a maximum.

That is, as shown in FIGS. 20 and 21, the protruding portion 181 may be formed to protrude in a right-angled shape inside the storage compartment 20 such that the auxiliary vacuum insulation member 220c may have a circular-shaped cross section which has a circumferential length of a length of a cross section of one right-angled surface of the protruding portion 181.

The auxiliary vacuum insulation member 220c according to another embodiment of the present invention may have a cylindrical shape which has a circular-shaped cross section and extends in the frontward and rearward directions of the refrigerator 1.

Accordingly, the distance D6 may be designated as a distance between one side of an outer circumferential surface of the auxiliary vacuum insulation member 220c and each of the vacuum insulation members 200. Accordingly, the minimum distance D6 may be provided to be the same as the distance D5.

Hereinafter, a vacuum insulation member 200a according to another embodiment of the present invention will be described. Since other components in addition to components of the vacuum insulation member 200a, which will be described below, are identical to those of the above-described one embodiment, descriptions thereof will be omitted.

FIG. 23 is an enlarged view illustrating a part of a cross section of the refrigerator according to another embodiment of the present invention.

Since the third area 180 of the insulating wall 100 includes the protruding portion 181 which protrudes inside the storage compartment 20, a problem in which the capacity of the storage compartment 20 is reduced occurs. However, since there is no space for accommodating the auxiliary vacuum insulation member 220 disposed inside the third area when the third area 180 is not included, the auxiliary vacuum insulation member 220 may also not be included such that the vacuum insulation member 200 cannot cover the entirety of an outer perimeter of the storage compartment 20 and insulation performance may be decreased.

Accordingly, the capacity of the storage compartment 20 is increased because the third area 180 is not included. At the same time, at least one of vacuum insulation member 200a of the plurality of vacuum insulation members 200 may be formed to be disposed to be adjacent to the inner casing 40 such that a part of the storage compartment 20, at which the reinforcing member 240 is provided, may also be covered by the vacuum insulation member 200a to allow the vacuum insulation member 200 to cover the entirety of the outer perimeter of the storage compartment 20.

That is, although the vacuum insulation member 200 according to one embodiment of the present invention is not disposed in an area in which the reinforcing member 240 is disposed, the vacuum insulation member 200a according to another embodiment of the present invention may be disposed on the inner casing 40 to overlap a side on which the reinforcing member 240 disposed on the inside surface of the outer casing 50.

Accordingly, the vacuum insulation member 200a generally includes the area A1 generally disposed on the outer casing 50 to maintain insulation performance and an area A4 capable of maintaining insulation performance even in the area in which the reinforcing member 240 is disposed.

As shown in FIG. 23, the vacuum insulation member 200a disposed corresponding to the rear surface 54 may be disposed on the inner casing 40 corresponding to the rear surface 54, unlike the vacuum insulation members 200 directly arranged on the left side surface 52 and the right side surface 53.

This is to maintain insulation performance even in the area A4 in which the reinforcing member 240 is disposed by extending the vacuum insulation member 200a to the reinforcing member 240 side provided at the corner part 55 of the outer casing 50 as described above.

In detail, the area A4 in which the vacuum insulation member 200a extends to the side on which the reinforcing member 240 is disposed may be provided to extend to a part at which the storage compartment 20 is formed. Through this, it is possible to cover the entirety of the outer perimeter of the storage compartment 20.

At the same time, the distance D6 between the vacuum insulation member 200a disposed on the inner casing 40 corresponding to the rear surface 54 and each of the vacuum insulation members 200 disposed on the left and right side surfaces 52 and 53 may be provided to be the same as or greater than the distance D5 between the vacuum insulation member 200 and the inner casing 40.

Unlike the embodiment shown in FIG. 23, the vacuum insulation member 200a disposed on the inner casing 40 may be disposed on each of the inner casings 40 disposed corresponding to the left side surface 52 and the right side surface 53. Here, the vacuum insulation member 200 may be directly disposed on the rear surface 54. That is, it is possible to arrange the vacuum insulation member 200 disposed on the outer casing 50 and the vacuum insulation member 200a disposed on the inner casing 40 to be opposite, as shown in FIG. 23.

Hereinafter, refrigerators 1' and 1" according to other embodiments of the present invention will be described. Since other components in addition to components of the refrigerators 1' and 1", which will be described below, are identical to those of the above-described one embodiment, descriptions thereof will be omitted.

FIG. 24 is a perspective view of a refrigerator according to another embodiment of the present invention, FIG. 25 is a cross-sectional view of the refrigerator according to another embodiment of the present invention, FIG. 26 illustrates a refrigerator according to another embodiment of the present invention, and FIG. 27 is a cross-sectional view of the refrigerator according to another embodiment of the present invention.

Like the refrigerator 1, which is a side-by-side type refrigerator, according to one embodiment of the present invention, first insulating walls and of a top-mount-freezer type refrigerator 1' and a French-door type refrigerator 1" shown in FIGS. 24 and 26 may include first areas and second areas.

Also, a third area or formed between the first insulating wall or and a second insulating wall or is included such that an auxiliary vacuum insulation member or may be provided between vacuum insulation members or.

Unlike the above-described embodiment of the present invention, the insulating walls 100' and 100" according to other embodiments of the present invention may not include the partition wall 160 which divides storage compartments 20' and 20" into a left side and a right side.

Particular embodiments have been illustrated and described above. However, it should be appreciated by one of ordinary skill in the art that various changes may be made without departing from the technical concept of the present invention defined in the claims.

The invention claimed is:

1. A refrigerator comprising:
   an inner casing that forms a storage compartment and comprises an opening and a protruding portion;
   an outer casing provided outside the inner casing; and
   an insulating wall formed by at least one of the inner casing and the outer casing to have a thickness, wherein:
   the insulating wall comprises:
      a first insulating wall that extends from the opening; and
      a second insulating wall that is located opposite the opening and meets the first insulating wall,
   the first insulating wall comprises a first area adjacent to the opening and a second area that extends from the first area toward the second insulating wall, and
   a thickness of the first area is thicker than a thickness of the second area;
   a vacuum insulation member provided in a third area of the first insulating wall on a surface of the outer casing; and
   an auxiliary vacuum insulation member provided in the protruding portion in the third area, wherein the auxiliary vacuum insulation member is provided on a surface of the inner casing facing the outer casing.

2. The refrigerator of claim 1, wherein:
   the vacuum insulation member is disposed in a space provided between the inner casing and the outer casing and a foam material formed by being foamed in the space, and
   the first area comprises a first part in which the vacuum insulation member is not disposed.

3. The refrigerator of claim 2, wherein the first part is provided between the opening and one side of the first area.

4. The refrigerator of claim 2, wherein the inner casing and the outer casing are assembled at the first part.

5. The refrigerator of claim 2, wherein a maximum thickness formed at the first part is a maximum thickness of the first insulating wall.

6. The refrigerator of claim 2, wherein the first part is formed to have a thickness between 30 mm and 55 mm.

7. The refrigerator of claim 2, wherein the first area further comprises a second part at which the vacuum insulation member and the foam material are arranged together.

8. The refrigerator of claim 7, wherein a thickness of one side of the second part, which is adjacent to the first part, is thicker than a thickness of an other side, which is adjacent to the second area.

9. The refrigerator of claim 2, wherein the second area comprises the vacuum insulation member in all sections thereof.

10. The refrigerator of claim 2, wherein a thickness of the foam material formed in the second area is between 5 mm and 10 mm.

11. The refrigerator of claim 2, wherein a thickness of the foam material formed in the first area is thicker than a thickness of the foam material formed in the second area.

12. The refrigerator of claim 2, wherein:
the insulating wall further comprises the third area formed at a position at which the first insulating wall and the second insulating wall meet, and
a thickness of the foam material at a part at which the third area and the first insulating wall meet is at least the same as a minimum thickness of the foam material.

13. The refrigerator of claim 12, wherein a thickness of the foam material at a part at which the third area and the second insulating wall meet is at least the same as the minimum thickness of the foam material.

14. The refrigerator of claim 12, wherein:
the third area comprises the protruding portion that protrudes toward the storage compartment, and
the auxiliary vacuum insulation member is provided in a space inside the protruding portion.

15. The refrigerator of claim 12, wherein:
a reinforcing member is provided inside the outer casing that forms the third area, and
a thickness of the foam material formed in a space provided between the auxiliary vacuum insulation member and the reinforcing member is thicker than a thickness of the foam material formed in the first area.

* * * * *